US012620158B2

(12) United States Patent　　　(10) Patent No.: US 12,620,158 B2

Sun et al.　　　(45) Date of Patent:　May 5, 2026

(54) SYSTEMS AND METHODS OF RENDERING EFFECTS DURING GAMEPLAY

(71) Applicant: INNOPEAK TECHNOLOGY, INC., Palo Alto, CA (US)

(72) Inventors: Hongyu Sun, Palo Alto, CA (US); Chen Li, Palo Alto, CA (US); Chengeng Li, Palo Alto, CA (US); Qiang Qiu, Palo Alto, CA (US); Huihui Xu, Palo Alto, CA (US); Steven Jackson, Palo Alto, CA (US); Andrew Pham, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 201 days.

(21) Appl. No.: 18/473,388

(22) Filed: Sep. 25, 2023

(65) Prior Publication Data

US 2024/0087206 A1　　Mar. 14, 2024

Related U.S. Application Data

(63) Continuation of application No. PCT/US2021/024222, filed on Mar. 25, 2021.

(51) Int. Cl.
*G06T 15/00*　　(2011.01)
*A63F 13/60*　　(2014.01)

(52) U.S. Cl.
CPC .............. *G06T 15/00* (2013.01); *A63F 13/60* (2014.09); *A63F 2300/6692* (2013.01)

(58) Field of Classification Search
CPC ......... G06T 15/00; G06T 15/04; G06T 15/80; G06T 2200/24; G06T 13/20; G06T 19/20;

G06T 5/90; G06F 3/04815; G06F 3/0482; A63F 13/60; A63F 2300/20; A63F 2300/40; A63F 2300/6692

See application file for complete search history.

(56) References Cited

U.S. PATENT DOCUMENTS

| | | | | |
|---|---|---|---|---|
| 11,468,915 B2 * | 10/2022 | van Welzen | ........... | G11B 27/10 |
| 2003/0179220 A1 | 9/2003 | Dietrich et al. | | |
| 2005/0251787 A1 | 11/2005 | Dietrich, Jr. et al. | | |
| 2009/0267956 A1 | 10/2009 | Greaves et al. | | |
| 2021/0225067 A1 * | 7/2021 | Guo | ..................... | G06T 15/005 |

OTHER PUBLICATIONS

International Search Report, International Application No. PCT/US2021/024222, mailed Jun. 4, 2021 (7 pages).
Chinese First Office Action, Chinese Application No. 202180095698.8, mailed Mar. 21, 2026 (21 pages).

* cited by examiner

*Primary Examiner* — Hau H Nguyen
(74) *Attorney, Agent, or Firm* — Ladas & Parry LLP

(57) ABSTRACT

Systems and methods of rendering effects are described herein. A computing device can receive a user selection of an effect to be applied during gameplay of a computer game. The computing device can initiate a framework with which to apply the effect during the gameplay. The computing device can determine scenes during the gameplay to apply the effect through the framework. The computing device can determine graphical elements in the scenes that correspond to non-user interface elements through the framework. The computing system can apply the effect to the graphical elements through the framework.

18 Claims, 18 Drawing Sheets

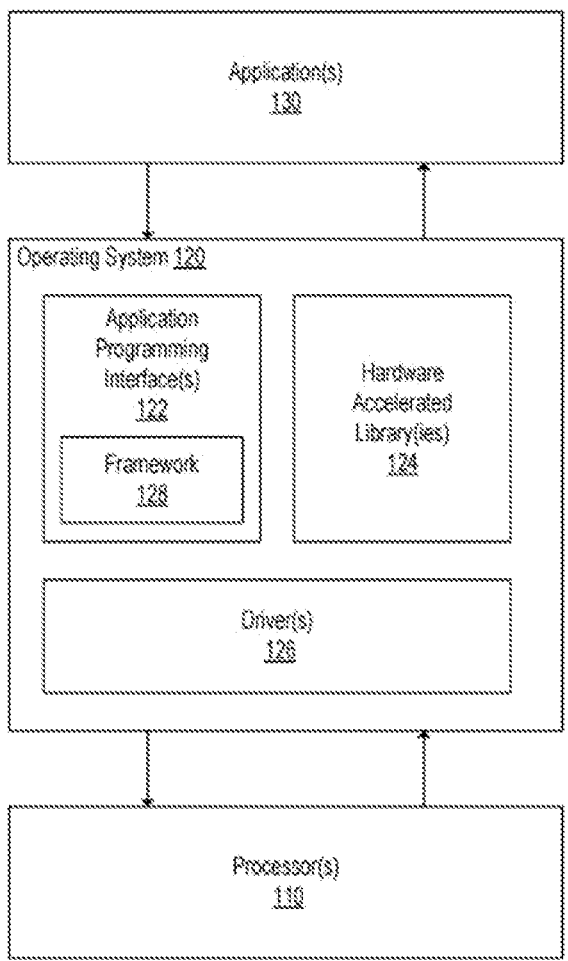
FIG. 1A

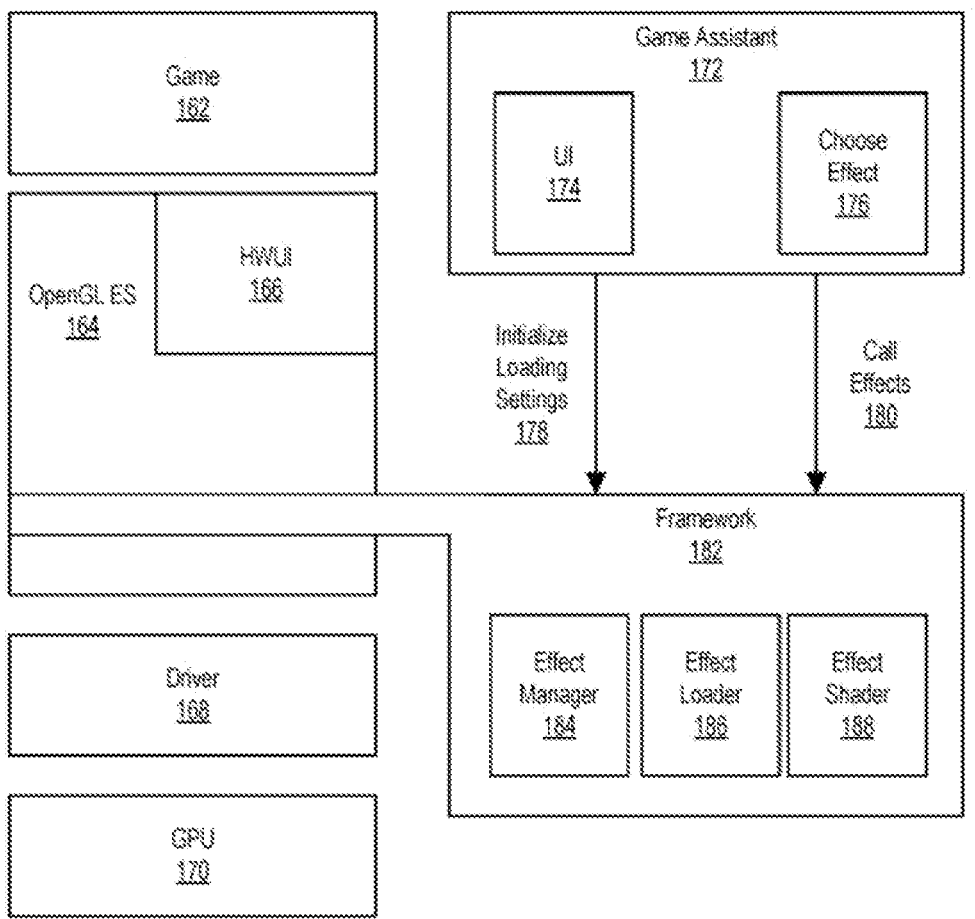
FIG. 1C

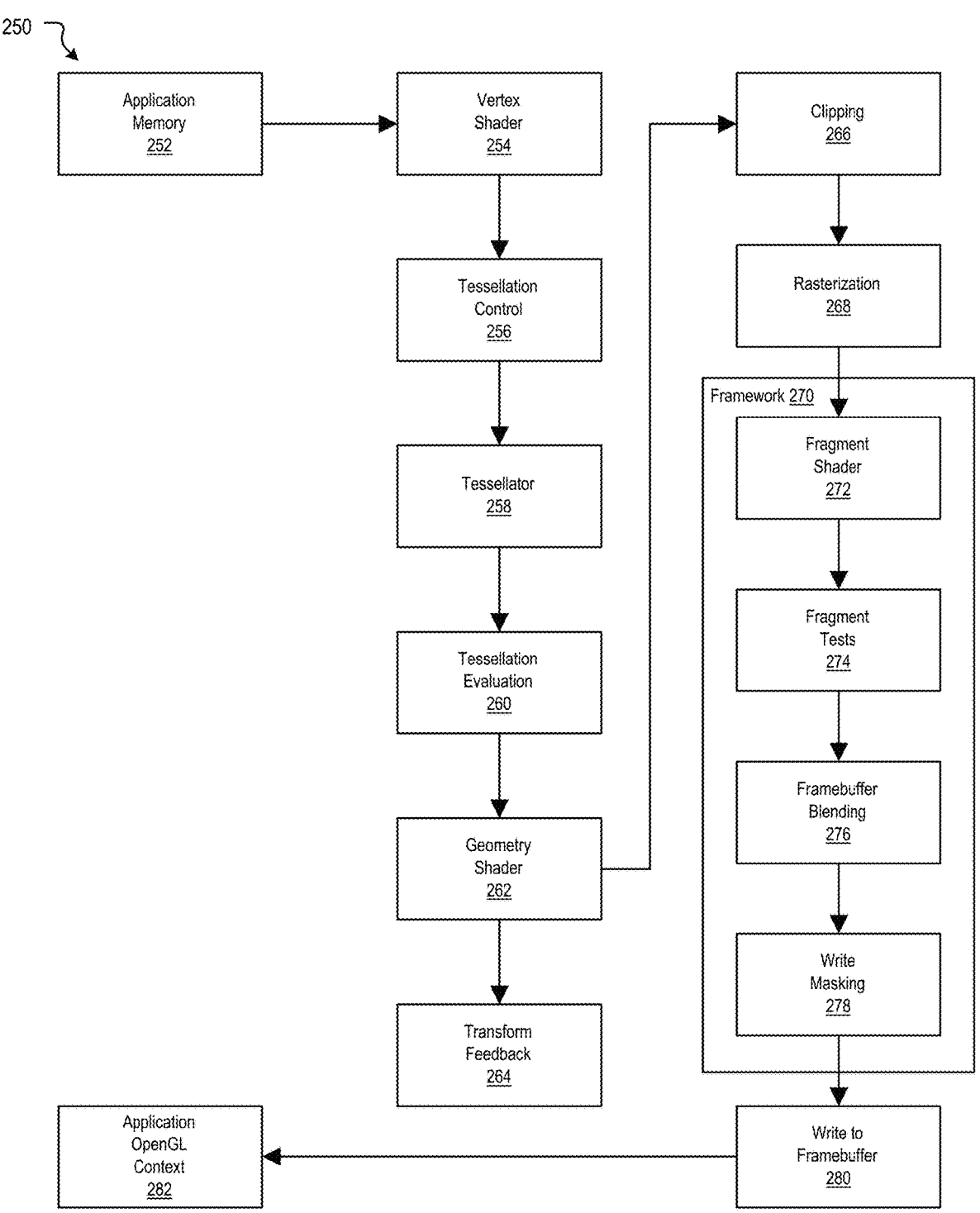

250

| Application Memory 252 | → | Vertex Shader 254 | → | Clipping 266 |

Vertex Shader 254 → Tessellation Control 256 → Tessellator 258 → Tessellation Evaluation 260 → Geometry Shader 262 → Transform Feedback 264

Geometry Shader 262 → Clipping 266 → Rasterization 268

Framework 270
Fragment Shader 272 → Fragment Tests 274 → Framebuffer Blending 276 → Write Masking 278

Write Masking 278 → Write to Framebuffer 280 → Application OpenGL Context 282

```
┌─────────────────────┐
│       Launch        │
│     Application      │
│         402         │
└─────────────────────┘
            │
            ▼
      ╱─────────────╲                    ┌─────────────────────┐
     ╱  Load Setting  ╲                  │      Turn Off       │
    ╱    from Game      ╲────────────────▶│     Framework       │
     ╲      404        ╱                  │         406         │
      ╲───────────────╱                   └─────────────────────┘
            │
            ▼
┌─────────────────────┐
│        Load         │
│     Framework       │
│         408         │
└─────────────────────┘
            │
            ▼
┌─────────────────────┐
│    UI Detection     │
│         410         │
└─────────────────────┘
            │
            ▼
┌─────────────────────┐
│   Post-Processing   │
│   Rendering 412     │
└─────────────────────┘
            │
            ▼
┌─────────────────────┐
│   Game Rendering    │
│       Result        │
│         414         │
└─────────────────────┘
```

FIG. 4A

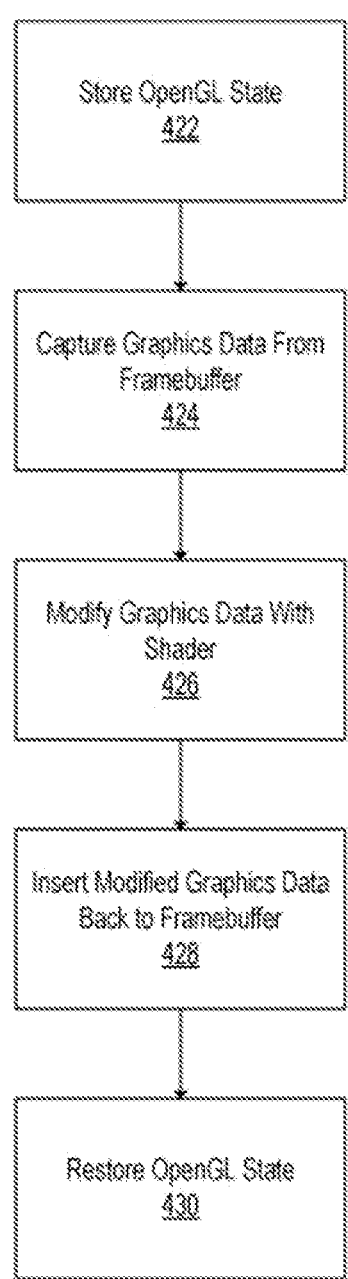
FIG. 4B

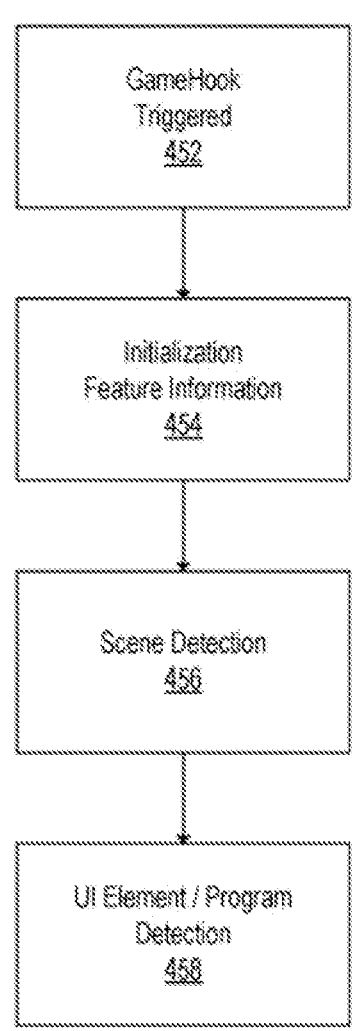
FIG. 4C

470

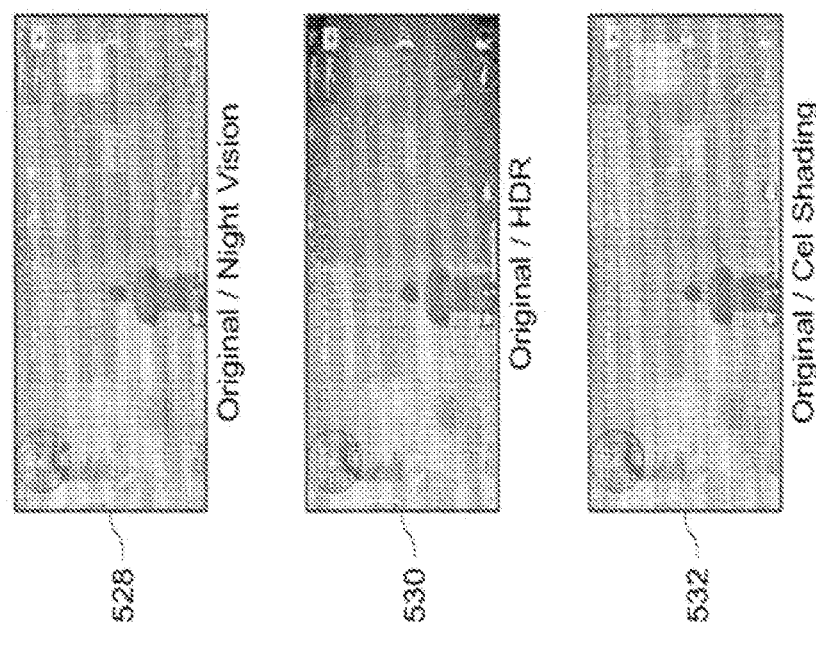
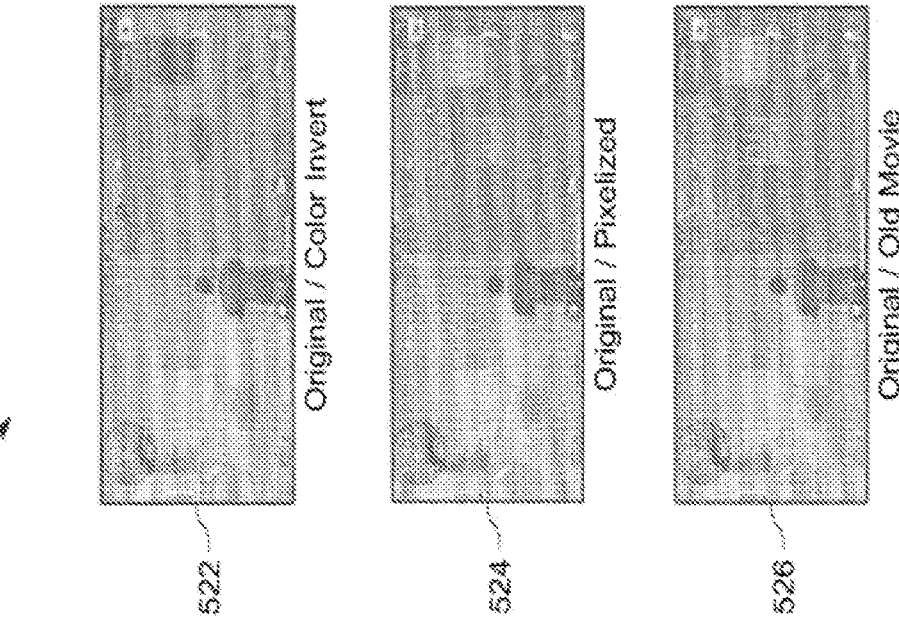
FIG. 5B

564

(b) Texture "Hud_NewCJ_2" in Renderdoc

568

(b) Texture Resource_3 in Renderdoc

560

562

(a) Game: CrossFire, battle scene 1

566

(a) Game: CrossFire, battle scene 2

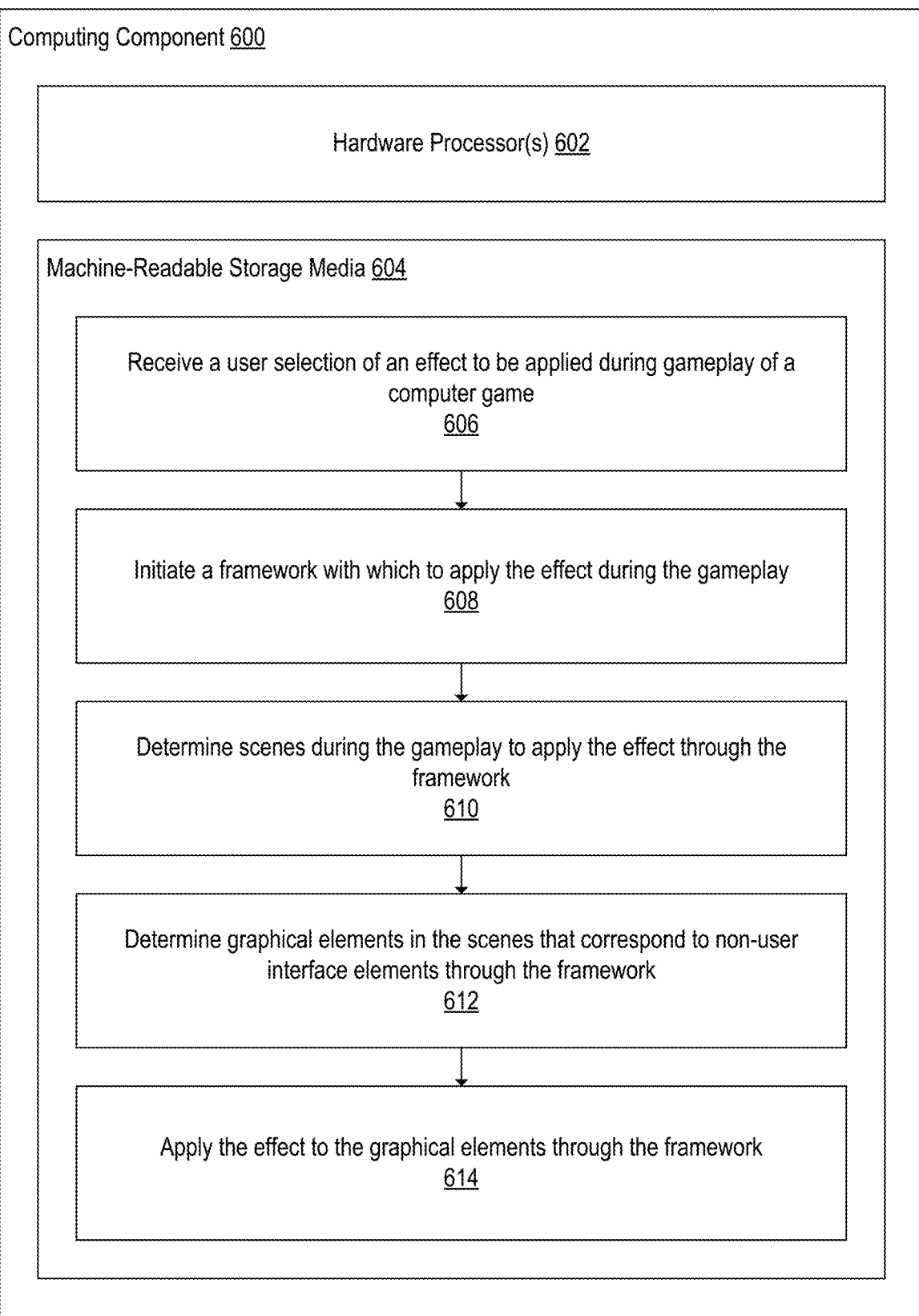

Computing Component 600

Hardware Processor(s) 602

Machine-Readable Storage Media 604

Receive a user selection of an effect to be applied during gameplay of a computer game
606

Initiate a framework with which to apply the effect during the gameplay
608

Determine scenes during the gameplay to apply the effect through the framework
610

Determine graphical elements in the scenes that correspond to non-user interface elements through the framework
612

Apply the effect to the graphical elements through the framework
614

FIG. 6

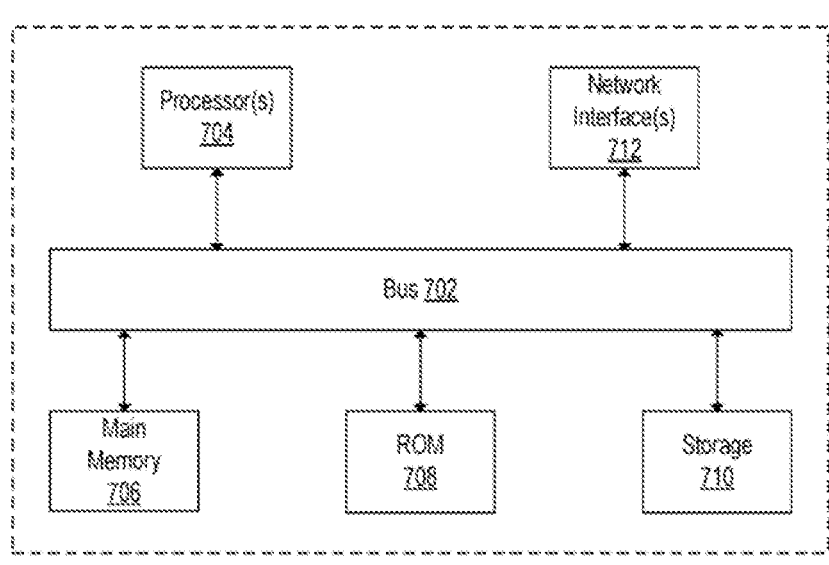
FIG. 7

SYSTEMS AND METHODS OF RENDERING EFFECTS DURING GAMEPLAY

CROSS REFERENCE TO RELATED APPLICATIONS

The present application is a continuation application of PCT/US2021/024222 filed on Mar. 25, 2021, and contents of which are incorporated herein by its entireties.

TECHNICAL FIELD

The present disclosure relates to the field of rendering techniques in game engines, and in particular to a computer-implemented method, a computing system, and a non-transitory storage medium.

BACKGROUND

Game development has evolved drastically in recent years. An increasing number of game engines, such as Unreal Engine, Unity, and CryEngine are available for game development on an increasing number of platforms, including mobile platforms. With the increasing number of available game engines and the increasing number of available platforms, game development faces several technical challenges. For example, modifying a game developed using a game engine for a platform so that the game can be implemented on other game engines for other platforms can be cumbersome and inefficient. Any later additions to the game would also need to be modified to be implemented on the other game engines and the other platforms. These technical challenges become exacerbated as game development continues to evolve and the number of available game engines and the number of available platforms continue to increase. Thus, the evolution of game development has created various technical challenges.

SUMMARY

According to one aspect of the present disclosure, a computer-implemented method for rendering effects is provided. The method may include: receiving a user selection of an effect to be applied during gameplay of a computer game or a mobile game; initiating a framework with which to apply the effect during the gameplay; determining, through the framework, scenes during the gameplay to apply the effect; determining, through the framework, graphical elements in the scenes based on detection of user interface elements; and applying, through the framework, the effect to the graphical elements.

According to another aspect of the present disclosure, a computing system is provided. The computing system may include: at least one processor; and a memory storing instructions that, when executed by the at least one processor, the computing system is configured to perform a method for rendering effects based on the instructions, the method comprising: receiving a user selection of an effect to be applied during gameplay of a computer game; initiating a framework with which to apply the effect during the gameplay; determining, through the framework, scenes during the gameplay to apply the effect; determining, through the framework, graphical elements in the scenes that correspond to non-user interface elements; and applying, through the framework, the effect to the graphical elements.

According to one aspect of the present disclosure, a non-transitory storage medium of a computing system storing instructions that, when executed by at least one processor of the computing system, the computing system is configured to perform a method for rendering effects based on the instructions, is provided. The method may include: receiving a user selection of an effect to be applied during gameplay of a computer game; initiating a framework with which to apply the effect during the gameplay; determining, through the framework, scenes during the gameplay to apply the effect; determining, through the framework, graphical elements in the scenes that correspond to non-user interface elements; and applying, through the framework, the effect to the graphical elements.

BRIEF DESCRIPTION OF THE DRAWINGS

The present disclosure, in accordance with one or more various embodiments, is described in detail with reference to the following figures. The figures are provided for purposes of illustration only and merely depict typical or exemplary embodiments FIG. 1A illustrates an example computer architecture, according to various embodiments of the present disclosure.

FIG. 1C illustrates an example computer architecture, according to various embodiments of the present disclosure.

FIG. 2B illustrates an example graphics rendering pipeline, according to various embodiments of the present disclosure.

FIG. 4A illustrates a block diagram for operation of a framework, according to various embodiments of the present disclosure.

FIG. 4B illustrates a block diagram for post-processing rendering, according to various embodiment of the present disclosure.

FIG. 4C illustrates a block diagram for user interface (UI) detection, according to various embodiment of the present disclosure.

FIG. 5B illustrates example screenshots in which various effects are applied, according to various embodiments of the present disclosure.

FIG. 6 illustrates a computing component that includes one or more hardware processors and machine-readable storage media storing a set of machine-readable/machine-executable instructions that, when executed, cause the one or more hardware processors to perform an illustrative method for rendering effects during gameplay, according to various embodiments of the present disclosure.

FIG. 7 illustrates a block diagram of an example computer system in which various embodiments of the present disclosure may be implemented.

Figure 1B:
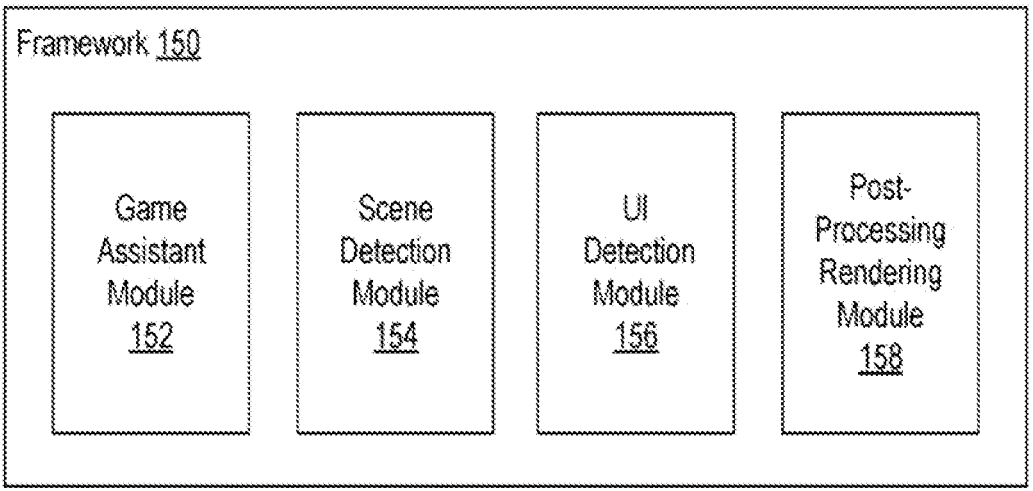
FIG. 1B illustrates an example framework, according to various embodiments of the present disclosure.

The figures are not exhaustive and do not limit the present disclosure to the precise form disclosed.

DETAILED DESCRIPTION

Games, especially mobile games, have experienced dramatic improvements and growth in recent years. As the technological space for games continues to grow, it becomes imperative that games be compatible with a wide variety of computing hardware ranging from, for example, specialized game consoles to mobile devices such as mobile phones and tablet computers. In this way, games can have broad appeal to users regardless of computing hardware. Making games compatible with a wide variety of computing hardware and game engines is technologically challenging. For example, a game may be specifically developed for computing devices running a particular operating system and/or supporting a particular game engine. In this example, to make the game compatible with other computing devices running a different operating system and/or supporting a different game engine, the game must be ported (e.g., modified) so that the game can run on the other computing devices. Porting a game may involve modifying an implementation of the game developed for a particular operating system and/or game engine to be compatible with other operating systems and/or game engines. In some cases, game developers may need to add additional features, such as applying effects or filters. In such cases, the game developers may need to modify implementations of the games to add these features and to ensure that any modifications to the games remain compatible with various operating systems and/or game engines supported by the games. This can present various technical challenges as the modifications may be implemented differently on different operating systems and game engines. Furthermore, in some cases, modifying game implementations may cause power consumption to increase and may introduce latencies during gameplay due to lack of game optimization to specific game engines. Thus, modifying a game to add features while maintaining compatibility with different operating systems and game engines presents technological challenges that conventional approaches fail to address.

The present disclosure provides solutions that address the technological challenges described above. In various embodiments, a custom framework can be integrated into an application programming interface (API) layer of an operating system of a computing device as part of the operating system. The custom framework can be configured to intervene graphics API calls (e.g., OpenGL API calls) initiated by a computer game and/or mobile game running on the computing device. The graphics API calls can cause processors of the computing device to render graphics on a screen of the computing device during gameplay of the computer game and/or mobile game. Instead of having the graphics API calls to cause the processors to render graphics during gameplay, the custom framework can directly modify graphics data associated with rendering graphics. The modification of the graphics data can cause the processors to render an effect (e.g., a filter) to graphics during gameplay. In this way, various effects can be applied, at an operating system level, during gameplay, for any computer games and/or mobile games running on the computing device without needing to have game developers modify the computer games and/or mobile games to include these effects. As such, the solution described herein improves over existing technologies by eliminating a need to individually modify computer games and/or mobile games to include effects during gameplay. In some embodiments, the custom framework can be further configured to detect user interface (UI) graphical elements from non-UI graphical elements based on graphics rendered during gameplay. The custom framework can selectively apply an effect only to the non-UI graphical elements while leaving the UI graphical elements intact. For example, the custom framework can evaluate graphics data of various framebuffers of the computing device. Framebuffers are used by the processors to render graphics on the screen of the computing device during gameplay. Based on the graphics data, the custom framework can determine UI graphical elements from non-UI graphical elements. In this example, the custom framework can apply an effect only to graphics data corresponding to the non-UI graphical elements. In this way, only gameplay graphics (e.g., the non-UI graphical elements) are applied with the effect while non-gameplay graphics (e.g., the UI graphical elements) remain the same. While the present disclosure may make references to a computer game or a mobile game, it should be understood that the various embodiments of the present disclosure can be applied to computer games, mobile games, computer applications, and mobile applications. These and other features of the solution are discussed in further detail herein.

FIG. 1A illustrates an example computer architecture 100 of a computing device, according to various embodiments of the present disclosure. In various embodiments, the computing device can be a mobile phone, a tablet computer, or a specialized game console. As shown in FIG. 1A, in some embodiments, the computer architecture 100 can include one or more processors 110, an operating system 120 configured to manage or interact with the one or more processors 110, and one or more applications 130 configured to run on the operating system 120. The one or more processors 110 can be configured to perform various computing tasks associated with the computing device. For example, the one or more processors 110 can include at least one graphics processing unit (GPU). The at least one GPU can perform frame-by-frame vertex transformations associated with objects rendered on a screen of the computing device (e.g., rendering of graphics during gameplay). As another example, the one or more processors 110 can include at least one central processing unit (CPU). The at least one CPU can perform various computational tasks, such as executing computer codes or other machine-readable instructions, as instructed by the one or more applications 130. In some embodiments, the operating system 120 can be configured to manage various computing resources of the computing device. For example, the operating system 120 can establish and maintain a wireless network connection between the computing device and an access point or a cellular site providing the wireless network connection. As another example, the operating system 120 can automatically terminate applications running in background to free up random access memory (RAM) of the computing device. In some embodiments, the one or more applications 130 can include various computer applications, such as computer games, that can be installed onto the operating system 120. Launching of the computer applications can cause the computing device (e.g., a general purpose computing device) to turn into a specialized computing device that performs functions embedded in the computer applications. For example, a mobile game can be installed onto a mobile device. In this example, launching of the mobile game can turn the mobile device into a gaming device.

In some embodiments, the operating system 120 can include one or more sets of application programming interfaces (APIs) 122, one or more hardware accelerated libraries 124, and one or more drivers 126. The one or more sets of APIs 122 are software programming interfaces that allow the one or more applications 130 to access the one or more processors 110 or other computing resources of the computing device through the operating system 120. The one or more set of APIs 122 can provide an abstraction layer between the one or more applications 130 and the one or more processors 110 such that the one or more applications 130 can be programmed easily to access the one or more processors 110 without need for lower-level machine languages. In general, there can be many sets of APIs. For example, there can be a set of APIs dedicated to rendering graphics on computing devices and another set of APIs dedicated to computer networking. Many other sets of APIs are possible. In some embodiments, the one or more sets of APIs 122 can comprise various function calls (i.e., API calls) that can be used by the one or more applications 130 to instruct the one or more processors 110 to perform certain computing tasks. For example, the operating system 120 can provide a set of graphics APIs (e.g., OpenGL APIs) that can be used by an application or computer game to access the at least one GPU and/or the at least one CPU to render graphics on a screen of the computing device. As another example, the operating system 120 can provide a set of networking APIs (e.g., TCP/IP APIs) that can be used by a web browser or any other network-based applications (e.g., social media applications) running on the computing device to access the Internet. In some embodiments, the one or more sets of APIs 122 can include a framework 128. The framework 128 is a custom API layer that can be embedded as part of the one or more sets of APIs 122. The framework 128 can be configured to intervene graphics API calls that render graphics on the computing device. Through the framework 128, one or more effects (e.g., filters) can be applied to graphics rendered on the screen of the computing device. For example, a mobile game may not include features that allow a user to apply different effects to graphics during gameplay of the mobile game. Generally, to have such features, a game developer of the mobile game needs to change implementations of the mobile game to add these features. The process of adding features to games can be time consuming. Therefore, in this example, by leveraging the framework 128, effects can be introduced during gameplay of the mobile game regardless of whether the game developer implements such features. Thus, the user can immediately enjoy playing the mobile game with the effects applied during gameplay without having to wait for the game developer to introduce such features. The framework 128 will be discussed in further detail with reference to FIG. 1B herein.

The one or more hardware accelerated libraries 124 are a set of APIs that, when used by the one or more applications 130, can offload rendering of UI graphical elements from a CPU to a GPU so that these UI graphical elements can be rendered faster. In general, the one or more hardware accelerated libraries 124 are needed to drive high-resolution displays or screens so that timing delays or ghosting effects are minimized. In some embodiments, the one or more hardware accelerated libraries 124 can include at least OpenGL HWUI libraries or, in some cases, CUDA-X GPU accelerated libraries.

The one or more drivers 126 are software components that allow the operating system 120 and the one or more processors 110 to communicate with each other. Through the one or more drivers 126, the operating system 120 can manage and control the one or more processors 110 and allow the one or more applications 130 to run smoothly on the computing device. For example, a mobile game is launched from a mobile device. Upon launching the mobile game, an operating system running on the mobile device can allocate, through drivers, various memory space needed to run the mobile game smoothly and to drive gameplay graphics at a preferred frame rate. In this example, to be able to run the mobile game smoothly, the operating system may need to terminate, through drivers, background applications to free up additional memory space.

FIG. 1B illustrates an example framework 150, according to various embodiments of the present disclosure. In some embodiments, the framework 128 of FIG. 1A can be implemented as the framework 150. As shown in FIG. 1B the framework 150 can include a game assistant module 152, a scene detection module 154, a user interface (UI) detection module 156, and a post-processing rendering module 158. Each of these modules will be discussed in further detail below.

The game assistant module 152 can be configured to provide a user interface upon launching a computer game from a computing device. The user interface can include one or more effects (e.g., filters) selectable by a user operating the computing device. The one or more effects can include, for example, a color invert effect, a night vision effect, a pixelized effect, a high dynamic range (HDR) effect, an old movie effect, or a cel shading effect. Many other effects are possible. In some embodiments, the user interface can further include an option that allows the user to deactivate the one or more effects. The one or more effects can be deactivated during gameplay of the computer game, and the computer game plays without the one or more effects on the computing device. In some embodiments, the user can select an effect from the one or more effects and the selected effect is activated and applied during gameplay of a computer game.

The scene detection module 154 can be configured to detect scenes with which to apply the selected effect during gameplay of the computer game. The scene detection module 154 can detect the scenes based on a texture scanning technique. The texture scanning technique can involve analyzing each scene (e.g., video frame) for various textures depicted in the scene. If no textures are detected in a scene, no effect is applied to that scene. If a texture is detected in a scene, then a selected effect is applied. In general, textures are objects or things rendered in a video frame during gameplay of a computer game. For example, there can be a texture for a crosshair rendered in a battle scene of a computing game. As another example, there can be a texture for a lobby rendered in a battle scene of a computer game. Based on the textures, the scene detection module 154 can determine whether to apply the selected effect to the textures. In some embodiments, the scene detection module 154 can determine textures depicted in a scene using a graphics debugging tool, such as Renderdoc. The graphics debugging tool categorizes each texture depicted in a scene into a category associated with a game engine. In cases where a texture depicted in a scene is not categorized, a hash value for the texture can be calculated to reveal the category to which the texture is categorized. Based on a category of a texture, the scene detection module 154 can determine whether to apply a selected effect to the texture.

The UI detection module 156 can be configured to determine whether graphical elements rendered in a scene during gameplay of the computer game correspond to UI elements. UI elements are graphical elements that correspond to control and/or status rendered during gameplay of a computer game. For example, UI elements can include graphical elements such as joysticks, health status, maps, or perspectives rendered during gameplay of a computer game. Non-UI elements can include, for example, graphical elements that correspond to characters, objects, items, or environments rendered during gameplay of a computer game. In some cases, a selected effect is applied to non-UI elements while the selected effect is not applied to UI-elements. In some embodiments, the UI detection module 156 can determine whether or not graphical elements rendered in a scene correspond to UI elements based on one or more passes that OpenGL graphical applications, such as computer games, utilize in rendering graphics on computer devices. In OpenGL graphical applications, there can be multiple distinct passes for a GPU to render graphics associated with the OpenGL graphical applications. For example, in one implementation, a computer game can render gameplay graphics on a computing device through a shadow pass, a color pass, a post-processing pass, and a UI pass. In this implementation, during the shadow pass, the computer game initiates OpenGL API calls to framebuffers to render shadows cast by objects depicted during gameplay. During the color pass, the computer game initiates OpenGL API calls to the framebuffers to render color of the objects (e.g., textures) depicted during gameplay. During the post-processing pass, the computer game initiates OpenGL API calls to the framebuffers to render the computer game's own special effects during gameplay. During the UI pass, the computer game initiates OpenGL API calls to the framebuffers to render UI elements during gameplay. As such, the UI detection module 156 can leverage the UI pass implemented in OpenGL graphical applications to determine whether or not graphical elements rendered in a scene during gameplay of the computer game correspond to UI elements.

The UI detection described herein has various applications besides determining graphical elements to be rendered in a scene. For example, the UI detection described herein can provide semantic information that provides more details related to a particular scene. As another example, the UI detection described herein can provide telemetry information, such as game activity statistics. The game activity statistics can include, for example, an amount of time a user spends on a scene. It should be understood that many applications are possible.

The post-processing rendering module 158 can be configured to apply the selected effect to non-UI elements rendered in a scene during gameplay of the computer game. In some embodiments, the post-processing rendering module 158 can store context information associated with graphics rendering (e.g., OpenGL states). The graphics rendering can be based on the context information, such as the OpenGL states. Based on the OpenGL states, the post-processing rendering module 158 intervenes OpenGL API calls initiated by the computer game during a color pass of graphics rendering. The OpenGL API calls can write graphic data to framebuffers which is accessible by the GPU to render pixel color to the non-UI elements. In this case, during the color pass, the post-processing rendering module 158 directly modifies the graphics data stored in the framebuffers to change pixel color of the non-UI elements. In this way, the post-processing rendering module 158 can directly apply the selected effect to the non-UI elements. For example, to apply an HDR effect to the non-UI elements, the post-processing rendering module 158 can change pixel color from RGB color space (i.e., red, green, blue color space) to HSV color space (i.e., hue, saturation, value color space) in the graphics data of the framebuffers. As another example, to apply a night vision effect to the non-UI elements, the post-processing rendering module 158 can render pixel color in shades of dark green and apply random noise over the shades of dark green in the graphics data of the framebuffers. The post-processing rendering module 158 can then restore the stored context information so the normal graphics rendering can resume. In this way, effects (or filters) can be applied during gameplay regardless of whether computer games running on the computing device include the effects, so long as the computer games access an OpenGL API layer with the framework 150 integrated. For example, using the technology described herein, one or more effects can be applied to images and videos displayed through a social media application or any other content sharing applications accessing an OpenGL API layer with the framework 150 integrated. In some cases, using the technology described herein, one or more effects can be applied to live television programming. Many variations are possible. In some embodiments, the post-processing rendering module 158 can be configured such that only one half of graphics is rendered with an effect while the other half of graphics is rendered in its original form. In such embodiments, the post-processing rendering module 158 modifies graphics data of framebuffers that correspond to the one half of graphics while leaving the other half of graphics intact.

FIG. 1C illustrates an example computer architecture 160 in which a post-processing framework intervenes with game related libraries and drivers, according to various embodiments of the present disclosure. In various embodiments, the example computer architecture 160 can be an implementation of the example computer architecture 100 of FIG. 1A and the example framework 150 of FIG. 1B.

As shown in FIG. 1C, the example computer architecture 160 can include game 162, OpenGL ES 164, HWUI 166, driver(s) 168, and GPU 170. The game 162, OpenGL ES 164, HWUI 166, driver(s) 168, and GPU 170 can generate a gaming environment, for example on a mobile device or other computing device. Game 162 may include computer executable instructions for delivering a game or other software application via the example computer architecture 160. OpenGL ES 164 may include a computer graphics rendering API (e.g., OpenGL for Embedded Systems) for rendering computer graphics. HWUI 166 may include one or more libraries that enable UI components to be accelerated using a processor, such as the GPU 170. HWUI 166 may correspond with an accelerated rendering pipeline for images and other data. Driver(s) 168 may include computer executable instructions for operating the GPU 170 by providing an interface between software applications to hardware devices. Driver(s) 168 may enable access to hardware functions without encoding precise details about the hardware on which the hardware functions are implemented. GPU 170 may include a specialized hardware engine to execute computer executable instructions to accelerate graphics operations and/or perform parallel, graphics operations.

As shown in FIG. 1C, the example computer architecture 160 can include game assistant 172 and framework 182. The game assistant 172 can include a user interface (UI) 174 and a choose effect 174. The UI 174 allows a user to select or choose an effect to apply. Based on a selected effect, the game assistant 172 can load settings corresponding to the selected effect from the choose effect 174. The framework 182 can include an effect manager 184, effect loader 186, and effect shader 188. The effect manager 184 can apply various effects by passing parameters to the effect loader 186. The parameters can include, for example, lights, wire mesh frames, tiles, animation, image perspectives, materials, textures, or other image wrappers and libraries. The effect loader 186 can include a library of, for example, textures, shades, shadows, and directional light corresponding with various effects. The effect shader 188 can implement rendering and generate various effects. Various functionalities described in relation to the effect manager 184, effect loader 186, and effect shader 188 can be implemented in conjunction or in parallel with functionalities described above in relation to framework 150 of FIG. 1B.

In various embodiments, the framework 182 intervenes between libraries (e.g., HWUI 166 and drivers (e.g., driver (s) 168) as a customized layer to OpenGL. The framework 182 can be invoked through the UI 174 of the game assistant 172. A user can select an effect to apply and, in response, the game assistant 172 can send an initialize loading settings 178 command and call effects 180 information to the framework 182. In some embodiments, the framework 182 modifies OpenGL ES 164 with the selected effect and recompiles OpenGL ES 164. This can cause the selected effect to be applied by OpenGL ES 164. In some embodiments, the framework 182 intercepts a customized layer of OpenGL ES 164. OpenGL ES 164 includes a GL ES layers system where behavior of OpenGL ES 164 can be modified. Framework binaries associated with a selected effect can be installed on OpenGL ES 164 through a push script. OpenGL ES 164 is then set, through system properties (e.g., debug.gles.layers), to reference the framework binaries associated with the selected effect instead of its default binaries. This allows the framework binaries of the selected effect to be called instead of the default binaries of OpenGL ES 164. Calls to OpenGL ES 164 can be monitored. When use of the selected effect is finished, OpenGL ES can be modified to call its default binaries instead of the framework binaries.

Figure 2A:
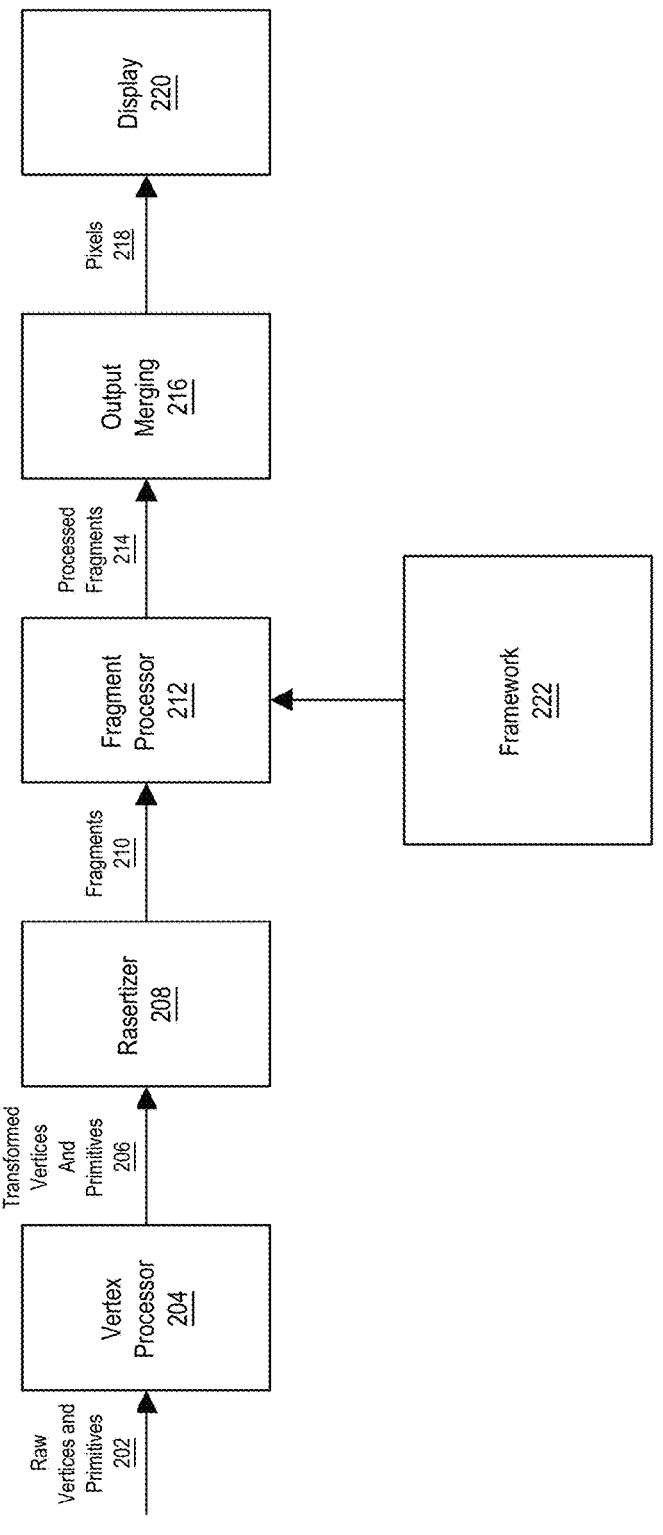
FIG. 2A illustrates an example graphics rendering pipeline, according to various embodiments of the present disclosure.

FIG. 2A illustrates an example graphics rendering pipeline 200 in which a post processing framework can be implemented, according to various embodiments of the present disclosure. The example graphics rendering pipeline 200 accepts a description of a 3D object in terms of raw vertices and primitives 202 and produces color values for pixels 218 for presentation on display 220. The raw vertices and primitives 202 can include, for example, triangles, points, lines, and quadrilaterals. The raw vertices and primitives 202 are provided to a vertex processor 204. The vertex processor 204 is programmable and can perform custom transforms for vertices and primitives. The vertex processor 204 generates transformed vertices and primitives 206 based on the raw vertices and primitives 202, and the transformed vertices and primitives 206 are provided to rasterizer 208. The rasterizer 208 generates images or fragments of images based on vertices and primitives describing the images. The rasterizer 208 generates fragments 210 based on the transformed vertices and primitives 206, and the fragments 210 are provided to fragment processor 212. The fragment processor 212 is programmable and can perform custom transforms for fragments. In some embodiments, framework 222 can be intervene with fragment processor 212 to apply effects to the fragments 210. The framework 222 can apply the effects based on one or more of the functionalities described herein. The fragment processor 212 generates processed fragments 214 based on the fragments 210, and the processed fragments 214 are provided to output merging 216. Output merging 216 generates a complete image based on the processed fragments 214, and the complete image is provided as pixels 218 to a display 220, where a user can view the complete image with effects applied by the framework 222.

FIG. 2B illustrates an example graphics rendering pipeline 250 in which a post processing framework can be implemented, according to various embodiments of the present disclosure. In the example graphics rendering pipeline 250, application memory 252 can provide vertex data for rendering a frame to vertex shader 254 for vertex processing. The vertex shader 254 can determine transformations (e.g., shading, lighting) for the vertex data. Tessellation control 256 can determine how much tessellation to apply to render the frame. For example, an object in a frame can be tessellated into triangles or other polygons, and tessellation control 256 can determine a number of triangles with which to render the object. Based on the determination from tessellation control 256, tessellator 258 can divide the vertex data into primitives. Tessellation evaluation 260 determines interpolated positions for the primitives. Geometry shader 262 processes the primitives and renders the primitives. In some cases, geometry shader 262 can render the primitives for multiple images using transform feedback 264. Transform feedback 264 captures primitives in a buffer and resubmits the primitives for rendering in the multiple images. The rendered primitives at this stage of the example graphics rendering pipeline 250 are provided for vertex post-processing. In vertex post-processing, clipping 266 can involve collecting generated primitives and clipping the collected primitives to a view volume. The view volume corresponds with a viewable space of a user and can be based on depth clamping or user-defined clip-planes. Rasterization 268 can involve generating fragments based on the primitives. The generated fragments can be provided to framework 270. In framework 270, fragment shader 272 applies selected effects to the generated fragments. Selected effects can be applied to the generated fragments based on custom binaries associated with the selected effects inserted into an OpenGL fragment shader. Fragment tests 274 determines whether a generated fragment can be discarded. For example, fragment tests 274 can include a pixel ownership test that determines whether a pixel associated with a fragment can be written to by the example graphics rendering pipeline 250. Framebuffer blending 276 determines color correction operations based on the generated fragment and a destination image. Write masking 278 filters write operations to a framebuffer. For example, write masking 278 can include a color mask for filtering certain colors from being written to a framebuffer. The generated fragments processed by the framework 270 are provided to write to framebuffer 280. A framebuffer can include multiple buffers, such as a color buffer, a depth buffer, and a stencil buffer. The fragments written to the framebuffer are provided, for example, on a computer display as a rendered image. Thus, modifying data written to the framebuffer modifies content displayed on the computer display. Writing to the framebuffer updates the application OpenGL context 282, updating the state of a particular instance of OpenGL.

In various embodiments, operation of the fragment shader 272 can be optimized for various platforms. When rendering an image with an effect, values of pixels of the image are read and modified to render the effect. The fragment shader 272 can use a framebuffer fetch functionality, such as shader_framebuffer_fetch to save read operations for image frames. Below are examples of shader_framebuffer_fetch functions, in accordance with various embodiments.

General Fragment Shader

```
#version 320 es
precision lowp float;
layout(binding = 0) uniform sampler2D tex;
in vec2 texCoord;
out vec4 FragColor;
void main( )
{
    vec4 color = texture(tex, texCoord.xy);
        // Effect algorithm.
        ........
}
```

Optimized Fragment Shader on MTK platform

```
#version 320 es
#extension GL__ARM__shader__framebuffer__fetch : require
precision lowp float;
out vec4 FragColor;
void main( )
{
    vec4 color = gl__LastFragColorARM;
    # Effect algorithm
        .........
}
```

Optimized Fragment Shader on Qualcomm platform

```
#version 320 es
#extension GL__EXT_shader__framebuffer__fetch : require
precision lowp float;
layout(location = 0) inout vec4 FragColor;
void main( )
{
    vec4 color = FragColor;
    # Effect algorithm
        ..........
}
```

Various test associated with optimized fragment shaders, according to various embodiments, demonstrate reduced power consumption. The tables below show experimental results of tests of optimized shaders.

TABLE 1

I/O Operation after Shader Optimization

| Effect name | I/O operation | Shader Calculation Range |
|---|---|---|
| None | 0 | 0 |
| empty | 2 = 1r & 1w | 0 |
| Old_movie | 1w | h*w * (~60*operators) |
| Color_invert | 1w | h*w * (3channel*3operaters+ |
| Cel_shading | 5 = 4r&1w | h*w * (~30*operators) |
| Night_visio | 1w | h*w * (3channel*2operaters) |
| Hdr | 1w | h*w * (~30*operators) |

Figure 3:
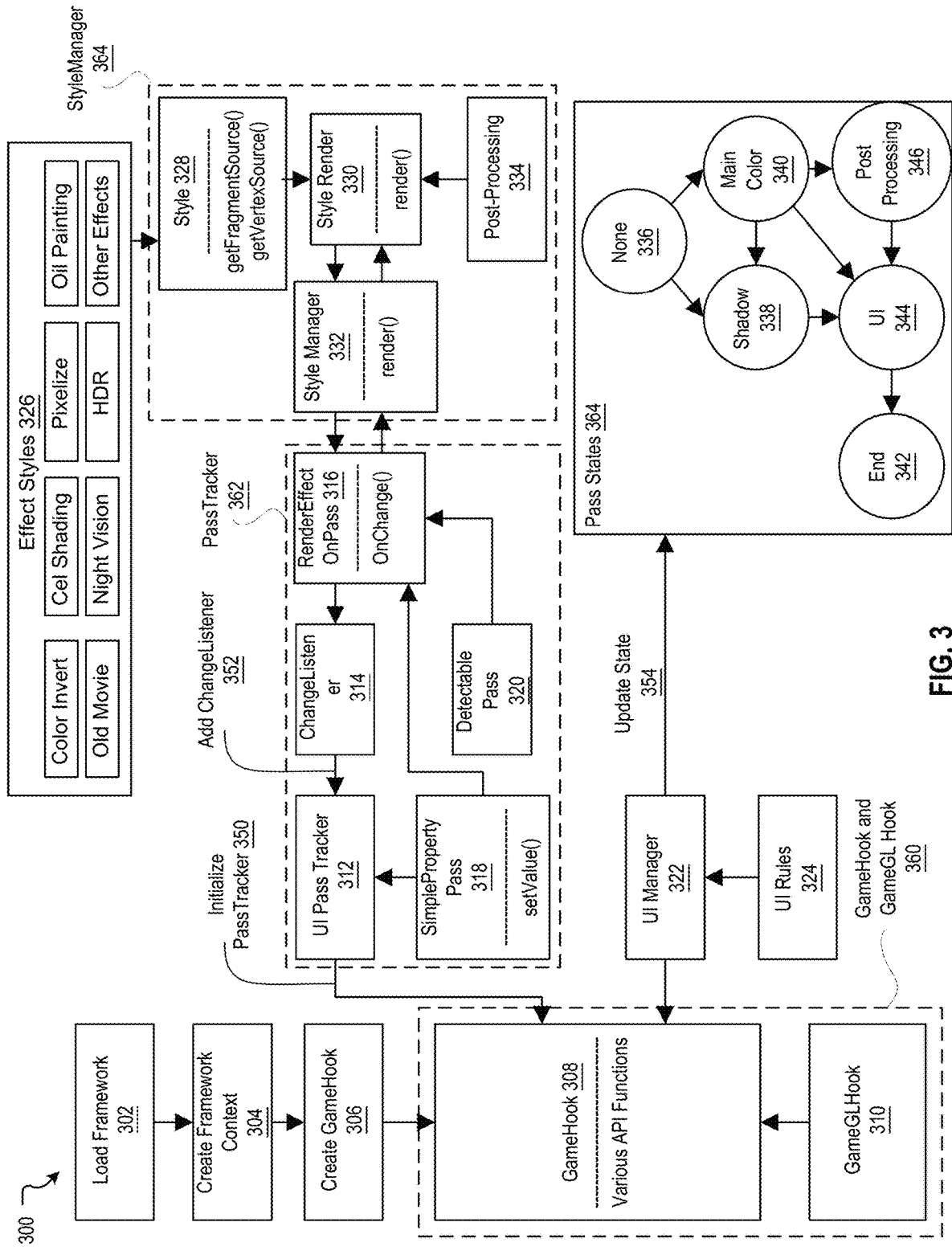
FIG. 3 illustrates an example workflow, according to various embodiments of the present disclosure.

FIG. 3 illustrates an example workflow 300 in which a post-processing framework intervenes with game related libraries and drivers to apply a selected effect, according to various embodiments of the present disclosure. In the example workflow 300, library can be loaded to an operating system to create a render context. Based on the render context, GameHook and GameGL Hook 360 can initialize StyleManager 364 and set up PassTracker 362 to apply a selected effect.

As illustrated in FIG. 3, GameHook and GameGL 360 can include GameHook 308 and GameGL Hook 310. Game- Hook 308 can be a general structure for abstracting a set of operations for shaders and communicating with rendering passes and pass states. GameHook 308 can include various API functions. The API functions can, for example, be called to initialize and register a hook to a GL function (e.g., GameGL Hook 310), reset frame information included in a pass state (e.g., pass states 364), track passes from a game/application, retrieve detectable passes, and retrieve a GL object for texture label tracking. A game or application rendering effect inherits a GameGL Hook 310 from Game-Hook 308. Based on a detected scene or UI element, pass states 364 is updated to set a rendering pass. Games/applications render objects in passes and pass states 364 can be based on the passes. Pass states 364 can include none 336, which can be when no pass is selected. Pass states 364 can also include shadow 338, which can be when a game/application is rendering shadow. Pass states 364 can also include main color 340, which can be when a game/application is rendering a scene. Pass states 364 can also include post processing, 346, which can be when a game/application is applying post processing effects to a result of rendering a scene (e.g., from main color 340). Pass states 364 can also include UI 344, which can be when a game/application is drawing a user interface. Various operations in GameHook and GameGL Hook 360 may cause an update state 354 in pass state 364. These updates are performed through UI manager 322, which operates subject to UI rules 324.

As illustrated in FIG. 3, PassTracker 362 can determine when a rendering pass is active. Based on pass states 364, RenderEffectOnPass 362 can determine a next pass for rendering, which can be, for example, SimpleProperty pass 318 or detectable pass 320. ChangeListener 314 can determine changes to the next pass and whether a rendering effect is to be applied on the next pass. Add ChangeListener 352 can be applied to the next pass. UI PassTracker 312 can initialize PassTracker 350 based on the next pass. For example, in a UI pass, an object to be rendered can be forwarded to render without a rendering effect. In a different pass state, StyleManager 364 can be invoked to determine a rendering effect to be applied.

As illustrated in FIG. 3, StyleManager 364 can manage rendering information and implementation. An effect style 326 (e.g., color invert, cel shading, pixelize, oil painting, old movie, night vision, HDR) and/or a render mode can be set and passed to StyleManager 364. An effect shader related to the effect style 326 is loaded by style 328 from a source file. The source file can be loaded, for example, via getFragmentSource( ) or getVertexSource( ). Post-Processing 334 can be applied to the effect style 326 and the effect style can be rendered as part of, for example, a render( ) operation by style render 330 and style manager 332.

FIG. 4A illustrates a block diagram 400 for operation of a framework through which one or more effects can be applied to graphics on a computing device, according to various embodiments of the present disclosure. As discussed above, the framework can be configured to apply the one or more effects independent of applications running on the computing device. At block 402, a computer game is launched from the computing device. Upon launching the computer game, at block 404, a user operating the computing device is presented with a game assistant (e.g., "Load Setting from Game"). In some embodiments, the game assistant can comprise a user interface (UI) that includes one or more effects (e.g., filters) selectable by the user and with which to apply to graphics during gameplay. For example, a user has launched a mobile game from a mobile device. Upon launching the mobile game, the user is presented with a UI from which the user can select an effect to apply during gameplay of the mobile game. In some cases, through the game assistant, the user can select an option of no effects to be applied during gameplay, in which case, the framework will not be loaded during gameplay of the computer game, at block 406, and the computer game plays normally. However, if the user selects an effect to be applied during gameplay, the framework will be loaded during gameplay of the computer game, at block 408.

At block 410, upon loading the framework, the framework is configured to detect scenes with which to apply the selected effect during gameplay of the computer game based on textures scanning using a graphics debugging tool. Upon determining that the scenes are to be applied with the selected effect, the framework then determines whether or not graphical elements rendered in the scenes correspond to non-UI elements. The framework can determine whether a graphical element is a UI or a non-UI element based on graphics data written to framebuffers during a UI pass inherent in OpenGL graphics rendering.

At block 410, upon determining that the graphical elements correspond to the non-UI elements, the framework, during a color pass inherent in OpenGL graphics rendering, modifies the graphics data of the framebuffers to change pixel color (e.g., "Post-Processing Rendering" 412). In this way, when the GPU of the computing device renders graphics, the selected effect is applied to the non-UI elements while the UI-elements are rendered normally (e.g., "Game Rendering Result" 414).

FIG. 4B illustrates a block diagram 420 for post-processing rendering, according to various embodiment of the present disclosure. In some embodiments, the functionalities described in block diagram 420 can be implemented by the post-processing rendering module 158 of FIG. 1B or post-processing 334 of FIG. 3. In general, post-processing rendering is a process of applying effects (e.g., filters) to graphics displayed on a computing device. In various embodiments, steps of the block diagram 420 can be performed by one or more processors including a GPU of the computing device through a framework (e.g., the framework 150 of FIG. 1B or the framework 182 of FIG. 1C) embedded in an OpenGL API layer of an operating system running on the computing device. At block 422, the framework can store context information associated with OpenGL states. The context information is accessible by the GPU of the computing device to render graphics. Storing the context information allows the framework to overwrite graphics data (i.e., applying effects to graphics) without interfering with normal graphics rendering process. The framework stores the context information in a class called StateStore. When the framework completes post-processing rendering, the context information is restored from the StateStore class back to the original OpenGL states.

At block 424, the framework can capture graphics data from framebuffers of OpenGL. Framebuffers, in general, are memory spaces allocated through OpenGL APIs in memory (e.g., RAM) associated with the GPU and are used by the GPU to drive graphics on the computing device. The framework can capture the graphics data from the framebuffers based on an availability of the framebuffers and types of the framebuffers. For example, in one implementation, the framework can capture graphic data in the following order of decreasing priority: GL_ARM_shader_framebuffer_fetch, GL_EXT_shader_framebuffer_fetch, color maps of the framebuffers, and texture maps of the framebuffers.

At block 426, the framework can modify the graphics data using a fragment shader to apply the effects to graphics displayed on the computing device. In some implementations, the framework, through the fragment shader, can apply an invented color effect by inverting pixel color to their corresponding inverse color by subtracting 1 from RGB color value through OpenGL. In some implementations, the framework, through the fragment shader, can apply a high dynamic range (HDR) effect by changing pixel color from RGB color space to HSV color space through OpenGL. In some implementations, the framework, through the fragment shader, can apply an old movie effect by converting pixel colors to shades of sepia and simulating sepia toning with scratch, noises, and vignetting through OpenGL. In some implementations, the framework, through the fragment shader, can apply a night vision effect by rendering pixel colors in shades of dark green and applying random noises through OpenGL. In some implementations, the framework, through the fragment shader, can apply a cel shading effect by using a fake toon shader to flatten pixel colors and applying a black outline through OpenGL. Many other effects are possible.

At block 428, once the graphics data is modified to include an effect, the framework can then insert the modified graphic data into the framebuffer from which the graphics data was captured. In this way, instead of displaying the original graphics on the computing device, the computing device now displays the original graphics with the effect applied.

At block 430, the framework restores the context information to the original OpenGL states so that normal rendering process can resume. In this way, various effects can be applied to graphics on the computing device regardless of computer games or applications running on the computing device. As long as the computer games or applications include API calls through OpenGL, the framework can apply a desired effect or filter to graphics associated with the computer games or applications.

FIG. 4C illustrates a block diagram 450 for UI detection, according to various embodiments of the present disclosure. At block 452, GameHook is triggered, initiating various approaches to applying an effect to graphics. At block 454, Initialization Feature Information determines information, such as texture information, call sequences, or texture values, for applying an effect based on the various approaches, which can be performed individually or in combination, for applying the effect. The feature information can be determined from API calls. In one approach involving texture information, a frame or image can be composed of various rendering textures and the rendering textures are bound to elements in an UI to render the UI. Thus, texture information can be feature information on which a determination of which elements to apply an effect can be based. In an approach involving call sequences, calls and combinations of calls can indicate changes in scenes and what scene is being drawn. For example, an API call, such as CLEAR, CLEAR_COLOR, CLEAR_DEPTH, CLEAR_STENCIL, COLOR_MASK, DEPTH_MASK, DISABLE, ENABLE, can indicate changes in scene. The API calls can be in an order, or frame signature, that is indicative of a scene being drawn. For example, a frame signature for a scene can be an order of API calls CLEAR_COLOR, CLEAR_STENCIL, CLEAR, DISABLE. When these API calls are called in the order of the frame signature, then the scene can be determined. In an approach involving texture values, texture values within a range can indicate a scene. A scene can include certain textures, and the textures can have certain texture values within a range that texture values of other textures are not. A scene change can be determined when texture values are cleared. For example, a game can include a scene that use darker colors than other scenes. This scene can be identified based on the texture values of the scene being within a range corresponding with the darker colors. At block 456, Scene Detection determines which scenes include elements to which to apply an effect. A scene can have representative textures that identify whether an effect is to be applied to the scene. Based on the representative texture, a determination of whether to apply an effect to the scene can be made. For example, in a game, a battle scene can include representative textures, such as textures associated with a heads up display (HUD). The representative textures may only appear in the battle scenes. Based on the representative textures, a battle scene can be identified and a determination can be made to apply an effect intended for battle scenes. At block 458, UI Element/Program Detection determines which elements to which to apply an effect. UI textures can be identified based on texture labels associated with the UI textures. In some cases, an effect is not applied to UI elements, and the UI elements can be identified based on the UI textures.

Figure 4D:
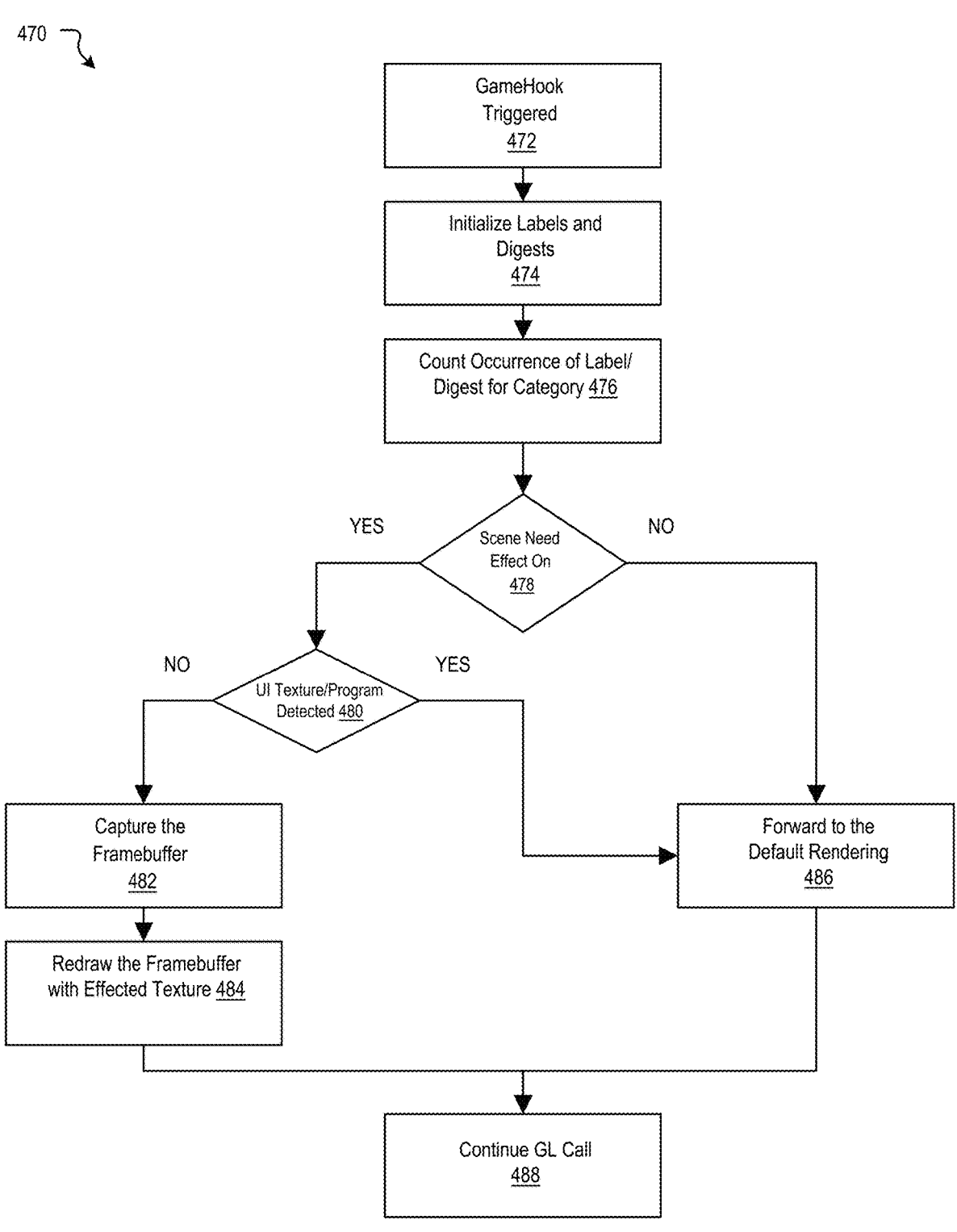
FIG. 4D illustrates a block diagram for general UI detection, according to various embodiment of the present disclosure.

FIG. 4D illustrates a block diagram 470 for scene detection, according to various embodiments of the present disclosure. A scene can include representative textures, and the representative textures can be associated with texture labels. The scene can be identified based on the texture labels. At block 472, GameHook is triggered, initializing the scene detection. At block 474, labels and digests are initialized. In some cases, the labels and digests can be determined based on a graphics debug tool, such as Renderdoc. These labels and digests correspond with various textures in a scene. At block 476, occurrences of labels and digests for a category are counted. Textures can be divided into different categories based on criteria for applying an effect. For example, in a battle game, textures can be divided into categories for a battle scene, a crosshair, and a lobby scene. At block 478, a determination is made as to whether a scene needs an effect on. The determination can be made based on a selected effect and a scene with which the selected effect corresponds. At block 480, a determination has been made that a scene needs an effect on, and a determination is made as to whether a UI texture/program is detected. In some cases, effects are not made to UI elements. At block 482, a determination has been made that a UI texture/program is not detected, and information in the framebuffer is captured. At block 484, the framebuffer is redrawn with an effected texture, which can be a texture with an effect applied. At block 486, either a determination has been made that a scene does not need an effect on or a UI texture/program is detected, and, based on these determinations, the textures are forwarded to default rendering, which can result in no effect being applied. At block 488, the GL call continues.

Figure 5A:
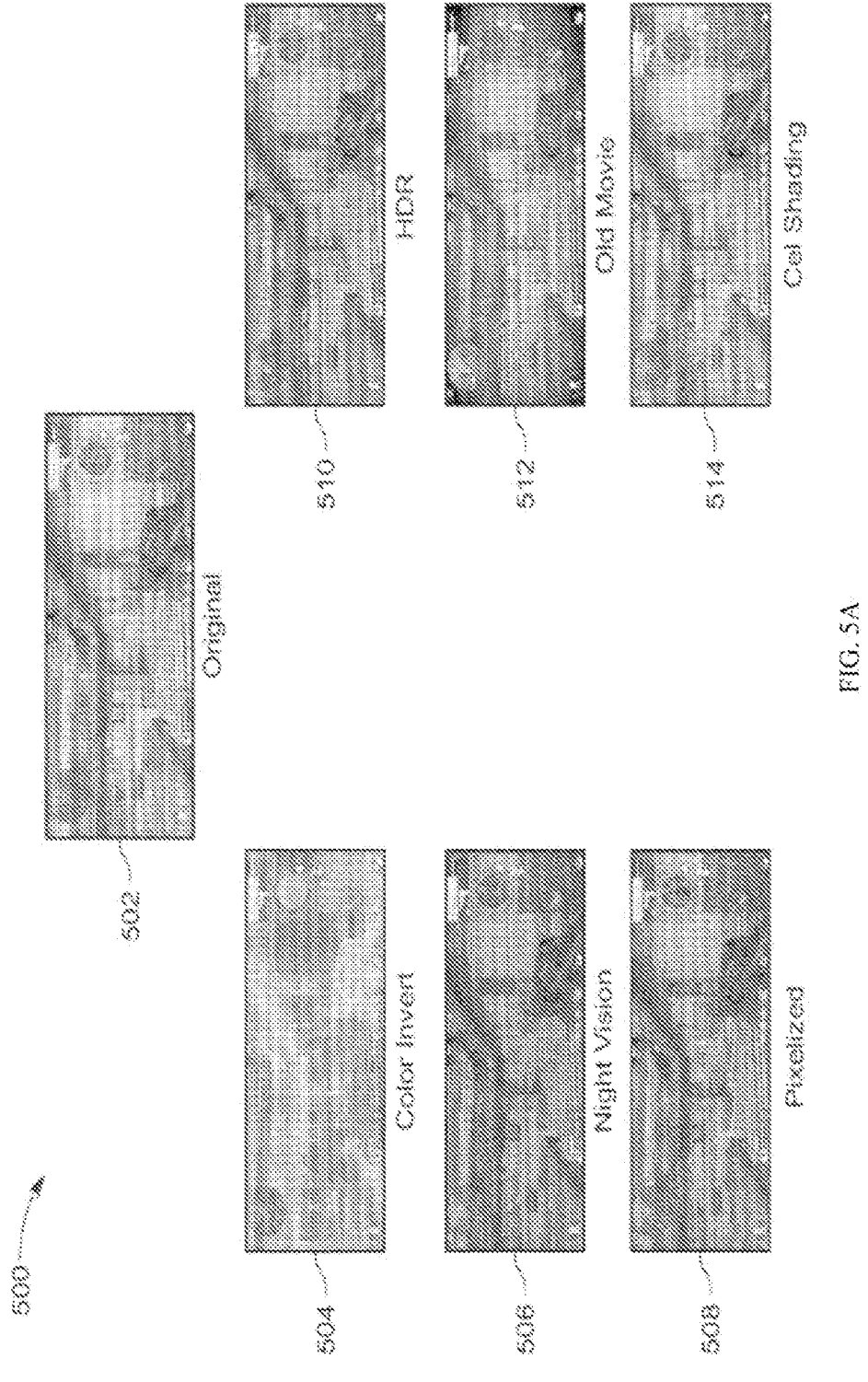
FIG. 5A illustrates example screenshots in which various effects are applied, according to various embodiments of the present disclosure.

FIG. 5A illustrates example screenshots 500 of a computer game in which various effects are applied to graphics during gameplay of the computer game, according to various embodiments of the present disclosure. The example screenshots 500 are screenshots captured during gameplay of the computer game in which various effects (e.g., filters) are applied using the technology disclosed herein. A screenshot 502 depicts a scenario in which no effect is applied to graphics. A screenshot 504 depicts a scenario in which a color invert effect is applied to graphics. A screenshot 506 depicts a scenario in which a night vision effect is applied to graphics. A screenshot 508 depicts a scenario in which a pixelized effect is applied to graphics. A screenshot 510 depicts a scenario in which an HDR effect is applied to graphics. A screenshot 512 depicts a scenario in which an old movie effect is applied to graphics. A screenshot 514 depicts a scenario in which a cel shading effect is applied to graphics. While certain effects are identified with regard to the example screenshots described in the present disclosure, it should be understood that various effects are possible.

FIG. 5B illustrates example screenshots 520 of a computer game in which various effects are applied to one half of graphics during gameplay of the computer game, according to various embodiments of the present disclosure. The example screenshots 520 are screenshots captured during gameplay of the computer game in which various effects (e.g., filters) are applied to one half of graphics using the technology disclosed herein. A screenshot 522 depicts a scenario in which no effect is applied to one half of graphics and a color invert effect is applied to the other half of graphics. A screenshot 524 depicts a scenario in which no effect is applied to one half of graphics and a pixelized effect is applied to the other half of graphics. A screenshot 526 depicts a scenario in which no effect is applied to one half of graphics and an old movie effect is applied to the other half of graphics. A screenshot 528 depicts a scenario in which no effect is applied to one half of graphics and a night vision effect is applied to the other half of graphics. A screenshot 530 depicts a scenario in which no effect is applied to one half of graphics and an HDR effect is applied to the other half of graphics. A screenshot 532 depicts a scenario in which no effect is applied to one half of graphics and a cel shading effect is applied to the other half of graphics.

Figure 5C:
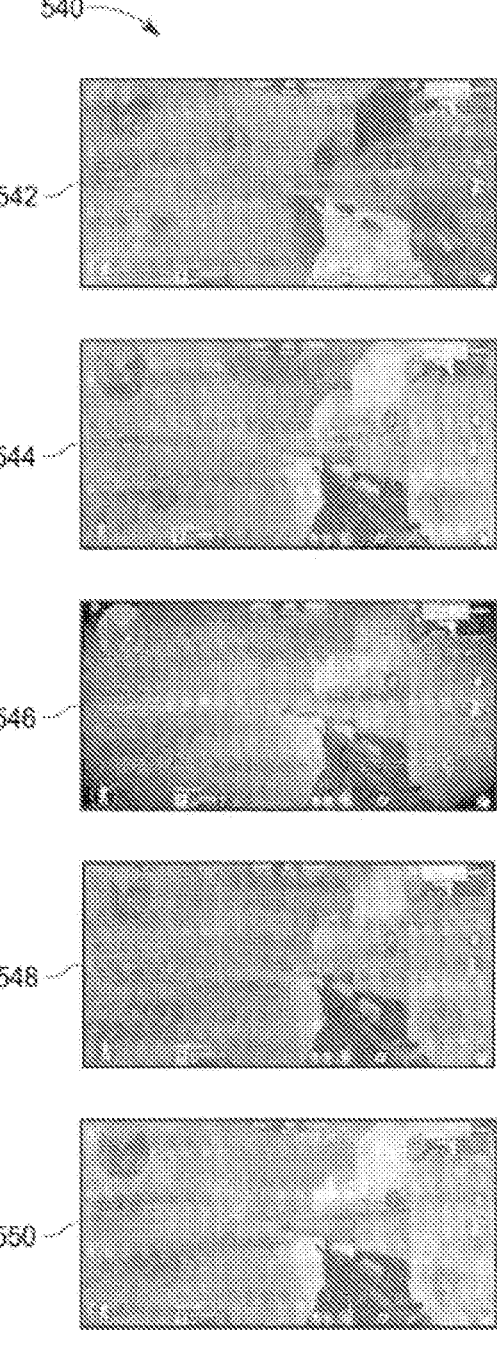
FIG. 5C illustrates example screenshots in which various effects are applied, according to various embodiments of the present disclosure.

FIG. 5C illustrates example screenshots 540 of a computer game in which various effects are applied to graphics during gameplay of the computer game, according to various embodiments of the present disclosure. The example screenshots 540 are screenshots captured during gameplay of the computer game in which various effects (e.g., filters) are applied. A screenshot 542 depicts a color invert effect. The color invert effect involves turning colors to their inverse, for example, by setting color (RGB)=1.0−color (RGB). A screenshot 544 depicts a HDR effect. The HDR effect simulates high-dynamic range imaging by changing color in HSV color space. A screenshot 546 depicts an old movie effect. The old movie effect converts colors to shades of sepia and simulates sepia toning of old movies with scratch, noise, and vignette effects. A screenshot 548 depicts a night vision effect. The night vision effect is simulated by rendering textures as a shade of dark green and applying noise that changes over time. A screenshot 550 depicts a cel shading effect. The cel shading effect involves a fake toon shader that flattens the colors and application of a black outline.

Figure 5D:
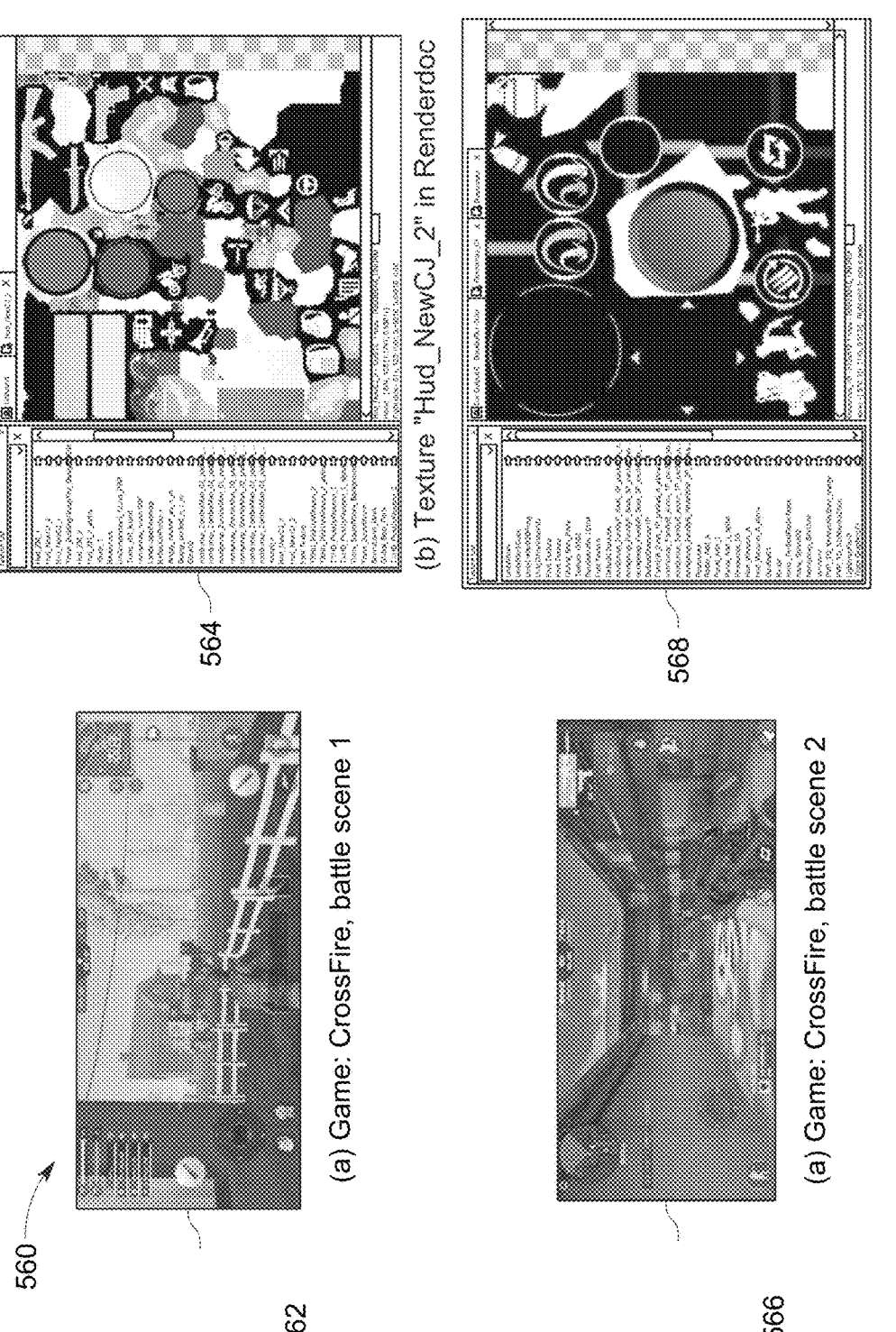
FIG. 5D illustrates example screenshots in which various effects are applied, according to various embodiments of the present disclosure.

FIG. 5D illustrates example screenshots 560 associated with determining texture labels in scene detection, according to various embodiments of the present disclosure. A screenshot 562 depicts a screenshot of a battle scene in a game. A screenshot 564 depicts textures used in the screenshot 562 and texture labels associated with the textures. In this example, the screenshot 562 can include a texture that, in the screenshot 564, has the label Hud_NewCJ_2. This label can be indicative of a battle scene, and the screenshot 562 can be determined to be a battle scene based on the label. A screenshot 566 depicts a screenshot of a different battle scene in a game. A screenshot 568 depicts textures used in the screenshot 566 and texture labels associated with the textures. In this example, the screenshot 568 illustrates that some textures may not be associated with texture labels. A digest hash value (e.g., SHA-512 checksum) can be calculated for the texture and used as a texture label. The digest hash value can be associated with the battle scene depicted in the screenshot 566. Battle scenes in the game can be determined based on presence of textures with the same digest hash value as the texture in the screenshot 566.

Figure 5E:
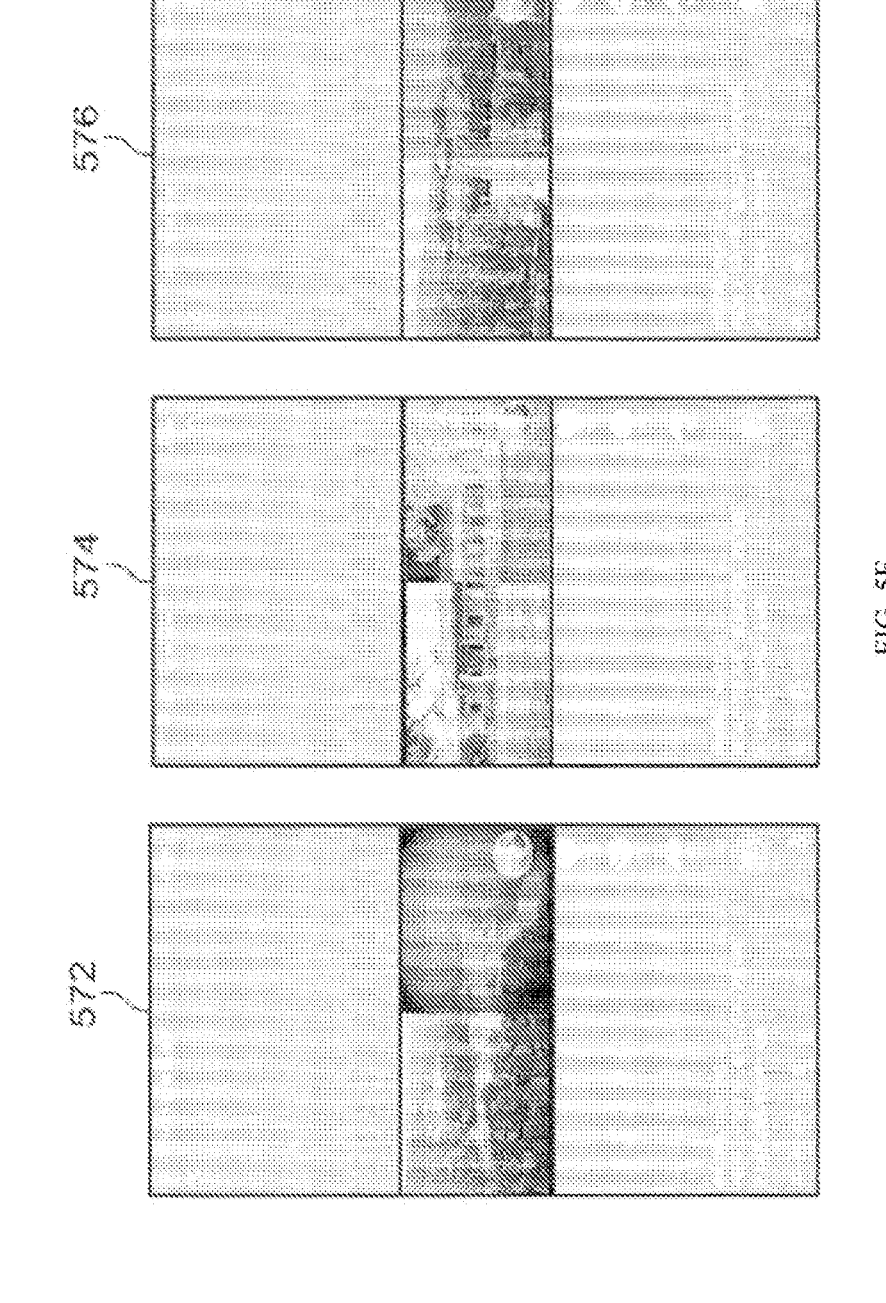
FIG. 5E illustrates example screenshots in which various effects are applied, according to various embodiments of the present disclosure.

FIG. 5E illustrates example screenshots 570 of effects applied to video applications, according to various embodiments of the present disclosure. A screenshot 572 depicts an old movie effect applied to half of a video during playback. A screenshot 574 depicts a color invert effect applied to half of a video during playback. A screenshot 576 depicts a night vision effect applied to half of a video during playback. As illustrated in the example screenshots 570, various embodiments of the present disclosure can be applied to a variety of games, videos, and other applications.

Figure 5F:
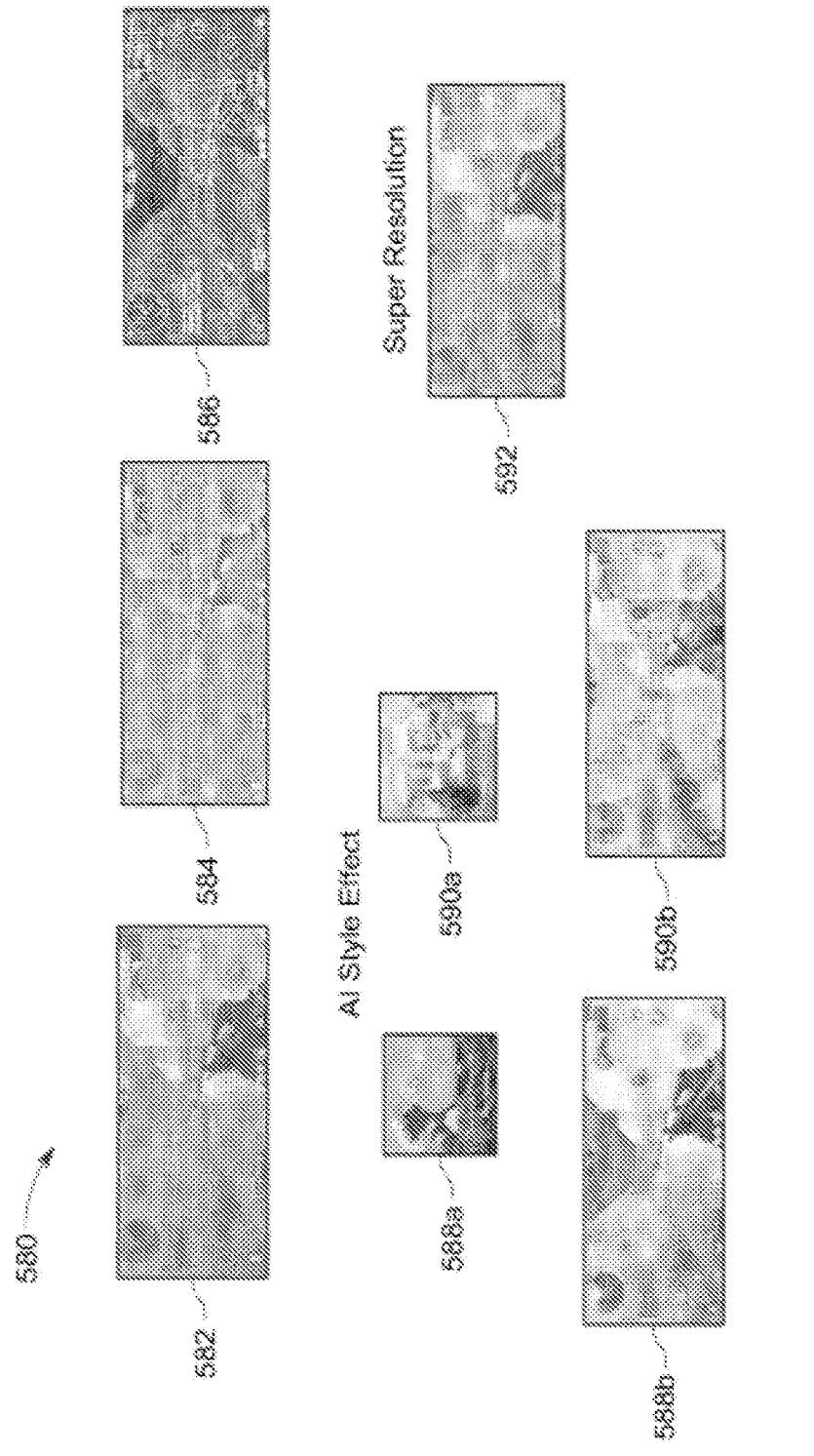
FIG. 5F illustrates example screenshots in which various effects are applied, according to various embodiments of the present disclosure.

FIG. 5F illustrates example screenshots 580 of various effects applied to graphics of a game, according to various embodiments of the present disclosure. The example screenshots 580 illustrate effects that may be generated by the various embodiments of the present disclosure. A screenshot 582 depicts graphics of a game during gameplay. The screenshot 582 depicts an original image with no effects. A screenshot 584 depicts a high pass filter applied to graphics of a game during gameplay. A screenshot 586 depicts a glowing edge effect applied to graphics of a game during gameplay. A screenshot 588*b* depicts an AI-based effect that involves applying effects based on a source image 588*a*. A screenshot 590*b* depicts an AI-based effect that involves applying effects based on a source image 590*a*. A screenshot 592 depicts a resolution effect that increases resolution of graphics of a game during gameplay. As illustrated in the example screenshots 580, a variety of effects are supported by the various embodiments of the present disclosure.

FIG. 6 illustrates a computing component 600 that includes one or more hardware processors 602 and machine-readable storage media 604 storing a set of machine-readable/machine-executable instructions that, when executed, cause the one or more hardware processors 602 to perform an illustrative method for rendering effects during gameplay, according to various embodiments of the present disclosure. The computing component 600 may be, for example, the computing system 700 of FIG. 7. The hardware processors 602 may include, for example, the processor(s) 704 of FIG. 7 or any other processing unit described herein. The machine-readable storage media 604 may include the main memory 706, the read-only memory (ROM) 708, the storage 710 of FIG. 7, and/or any other suitable machine-readable storage media described herein.

At block 606, the hardware processor(s) 602 may execute the machine-readable/machine-executable instructions stored in the machine-readable storage media 504 to receive a user selection of an effect to be applied during gameplay of a computer game. In some embodiments, the user selection can be received through a user interface provided by the computer device. In some embodiments, the user interface can be provided upon launching of the computer game from the computing device and can include one or more effects selectable by a user operating the computing device and with which to apply to graphics during the gameplay. In some embodiments, the one or more effects selectable by the user can include at least a color invent effect, a night vision effect, a pixelized effect, a high dynamic range effect, an old movie effect, and a cel shading effect. Various other effects are possible.

At block 608, the hardware processor(s) 602 may execute the machine-readable/machine-executable instructions stored in the machine-readable storage media 604 to initiate a framework with which to apply the effect during the gameplay. In some embodiments, the framework can be embedded in an application programming interface (API) layer of an operating system running on the computing device. In some embodiments, the framework can intervene OpenGL API calls initiated by the computer game during the gameplay.

At block 610, the hardware processor(s) 602 may execute the machine-readable/machine-executable instructions stored in the machine-readable storage media 604 to determine scenes during the gameplay to apply the effect through the framework. In some embodiments, the scenes can be determined based on detecting at least one texture depicted in the scenes during the gameplay. In some embodiments, the at least one texture can be detected based on a texture scanning technique using a graphics debugging tool. In some embodiments, the graphical debugging tool can associate the at least one texture to a category associated with a game engine.

At block 612, the hardware processor(s) 602 may execute the machine-readable/machine-executable instructions stored in the machine-readable storage media 604 to determine graphical elements in the scenes based on detection of user interface elements through the framework. In some embodiments, the graphical elements in the scenes that correspond to the non-user interface elements can be determined during a user interface pass of OpenGL graphics rendering on the computing device.

At block 614, the hardware processor(s) 602 may execute the machine-readable/machine-executable instructions stored in the machine-readable storage media 604 to apply the effect to the graphical elements through the framework. In some embodiments, the effect can be applied by modifying graphics data of framebuffers to change pixel color of the graphical elements during the gameplay.

FIG. 7 illustrates a block diagram of an example computer system 700 in which various embodiments of the present disclosure may be implemented. The computer system 700 can include a bus 702 or other communication mechanism for communicating information, one or more hardware processors 704 coupled with the bus 702 for processing information. The hardware processor(s) 704 may be, for example, one or more general purpose microprocessors. The computer system 700 may be an embodiment of an access point controller module, access point, or similar device.

The computer system 700 can also include a main memory 706, such as a random access memory (RAM), cache and/or other dynamic storage devices, coupled to the bus 702 for storing information and instructions to be executed by the hardware processor(s) 704. The main memory 706 may also be used for storing temporary variables or other intermediate information during execution of instructions by the hardware processor(s) 704. Such instructions, when stored in a storage media accessible to the hardware processor(s) 704, render the computer system 700 into a special-purpose machine that can be customized to perform the operations specified in the instructions.

The computer system 700 can further include a read only memory (ROM) 708 or other static storage device coupled to the bus 702 for storing static information and instructions for the hardware processor(s) 704. A storage device 710, such as a magnetic disk, optical disk, or USB thumb drive (Flash drive), etc., can be provided and coupled to the bus 702 for storing information and instructions.

Computer system 700 can further include at least one network interface 712, such as a network interface controller module (NIC), network adapter, or the like, or a combination thereof, coupled to the bus 702 for connecting the computer system 700 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 700, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques or technology described herein using customized hard-wired logic, one or more ASICs or FPGAs, firmware and/or program logic which in combination with the computer system 700 that causes or programs the computer system 700 to be a special-purpose machine. According to one or more embodiments, the techniques described herein are performed by the computer system 700 in response to the hardware processor(s) 704 executing one or more sequences of one or more instructions contained in the main memory 706. Such instructions may be read into the main memory 706 from another storage medium, such as the storage device 710. Execution of the sequences of instructions contained in the main memory 706 can cause the hardware processor(s) 704 to perform process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 710. The volatile media can include dynamic memory, such as the main memory 706. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, an NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 702. The transmission media can also take a form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method for rendering effects on a screen of a computing device during gameplay of a computer game or a mobile game, performed by the computing device, the method comprising:

receiving a user selection of an effect to be applied during the gameplay;

initiating a framework with which to apply the effect during the gameplay;

determining, through the framework, scenes during the gameplay to apply the effect;

determining, through the framework, graphical elements in the scenes based on detection of user interface elements; and applying, through the framework, the effect to the graphical elements;

wherein determining the scenes during the gameplay to apply the effect comprises:

detecting at least one texture depicted in the scenes during the gameplay, determining a frame signature based on a call sequence, or determining whether a texture value is within a texture value range;

wherein the at least one texture is detected based on a texture scanning technique using a graphics debugging tool, and wherein the graphical debugging tool associates the at least one texture to a category associated with a game engine.

2. The computer-implemented method of claim 1, wherein the user selection is received through a user interface provided by the computer device, and wherein the user interface is provided upon launching of the computer game or the mobile game from the computing device.

3. The computer-implemented method of claim 2, wherein the user interface includes one or more effects selectable by a user operating the computing device and with which to apply to graphics during the gameplay.

4. The computer-implemented method of claim 3, wherein the one or more effects selectable by the user include at least one of: a color invent effect, a night vision effect, a pixelized effect, a high dynamic range effect, an old movie effect, or a cel shading effect.

5. The computer-implemented method of claim 1, wherein the framework is embedded in an application programming interface (API) layer of an operating system running on the computing device.

6. The computer-implemented method of claim 5, wherein the framework intervenes OpenGL API calls initiated by the computer game or the mobile game during the gameplay.

7. The computer-implemented method of claim 1, wherein the detection of the user interface elements is performed during a user interface pass of OpenGL graphics rendering on the computing device and the graphical elements correspond to non-user interface elements.

8. The computer-implemented method of claim 1, wherein applying the effect to the graphical elements comprises: storing context information associated with OpenGL states, capturing graphics data of framebuffers, modifying the graphics data of the framebuffers to change pixel color of the graphical elements during the gameplay, and restore the context information to the OpenGL states.

9. The computer-implemented method of claim 1, wherein applying the effect to the graphical elements comprises frame shader optimization, wherein the frame shader optimization includes saving read operations for image frames based on a framebuffer fetch function.

10. The computer-implemented method of claim 1, wherein applying the effect to the graphical elements comprises modifying an OpenGL with the effect and recompiling the OpenGL.

11. A computing system comprising:
at least one processor; and
a non-transitory memory storing instructions that, when executed by the at least one processor, cause the computing system to perform a method for rendering effects on a screen of a computing device during gameplay of a computer game,
the method comprising:
receiving a user selection of an effect to be applied during the gameplay;
initiating a framework with which to apply the effect during the gameplay;
determining, through the framework, scenes during the gameplay to apply the effect;
determining, through the framework, graphical elements in the scenes that correspond to non-user interface elements; and
applying, through the framework, the effect to the graphical elements;
wherein determining the scenes during the gameplay to apply the effect comprises:
detecting at least one texture depicted in the scenes during the gameplay,
determining a frame signature based on a call sequence, or
determining whether a texture value is within a texture value range;

wherein the at least one texture is detected based on a texture scanning technique using a graphics debugging tool, and wherein the graphical debugging tool associates the at least one texture to a category associated with a game engine.

12. The computing system of claim 11, wherein the user selection is received through a user interface provided by the computer device, and wherein the user interface is provided upon launching of the computer game from the computing device.

13. The computing system of claim 12, wherein the user interface includes one or more effects selectable by a user operating the computing device and with which to apply to graphics during the gameplay.

14. The computing system of claim 13, wherein the one or more effects selectable by the user include at least one of: a color invent effect, a night vision effect, a pixelized effect, a high dynamic range effect, an old movie effect, or a cel shading effect.

15. A non-transitory storage medium of a computing system storing instructions that, when executed by at least one processor of the computing system, cause the computing system to perform a method for rendering effects on a screen of a computing device during gameplay of a computer game, the method comprising:
receiving a user selection of an effect to be applied during the gameplay;
initiating a framework with which to apply the effect during the gameplay;
determining, through the framework, scenes during the gameplay to apply the effect;
determining, through the framework, graphical elements in the scenes that correspond to non-user interface elements; and
applying, through the framework, the effect to the graphical elements;
wherein determining the scenes during the gameplay to apply the effect comprises:
detecting at least one texture depicted in the scenes during the gameplay,
determining a frame signature based on a call sequence, or
determining whether a texture value is within a texture value range;
wherein the at least one texture is detected based on a texture scanning technique using a graphics debugging tool, and wherein the graphical debugging tool associates the at least one texture to a category associated with a game engine.

16. The non-transitory storage medium of claim 15, wherein the user selection is received through a user interface provided by the computer device, and wherein the user interface is provided upon launching of the computer game from the computing device.

17. The non-transitory storage medium of claim 16, wherein the user interface includes one or more effects selectable by a user operating the computing system and with which to apply to graphics during the gameplay.

18. The non-transitory storage medium of claim 17, wherein the one or more effects selectable by the user include at least one of a color invent effect, a night vision effect, a pixelized effect, a high dynamic range effect, an old movie effect, or a cel shading effect.

* * * * *